(12) United States Patent
Yamada et al.

(10) Patent No.: US 11,648,905 B2
(45) Date of Patent: May 16, 2023

(54) OCCUPANT PROTECTION DEVICE

(71) Applicant: TOYODA GOSEI CO., LTD., Kiyosu (JP)

(72) Inventors: Shinji Yamada, Nagoya (JP); Atsushi Nakamura, Kiyosu (JP); Yuji Matsuzaki, Kiyosu (JP); Kazumi Fukaura, Kiyosu (JP); Yasushi Masuda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 2 days.

(21) Appl. No.: 17/388,172

(22) Filed: Jul. 29, 2021

(65) Prior Publication Data
US 2022/0048460 A1 Feb. 17, 2022

(30) Foreign Application Priority Data

Aug. 11, 2020 (JP) .............................. JP2020-135990
Dec. 24, 2020 (JP) .............................. JP2020-214959

(51) Int. Cl.
*B60R 21/18* (2006.01)
*B60R 21/207* (2006.01)

(52) U.S. Cl.
CPC ............ *B60R 21/207* (2013.01); *B60R 21/18* (2013.01)

(58) Field of Classification Search
None
See application file for complete search history.

(56) References Cited

U.S. PATENT DOCUMENTS

| 3,933,370 | A  | * | 1/1976 | Abe ..................... | B60R 21/18 |
|-----------|----|---|--------|-------------------------|------------|
|           |    |   |        |                         | 297/471    |
| 7,163,236 | B2 | * | 1/2007 | Masuda ................. | B60R 21/18 |
|           |    |   |        |                         | 280/733    |
| 7,513,524 | B2 | * | 4/2009 | Oota .................... | B60R 21/18 |
|           |    |   |        |                         | 280/733    |
| 7,665,761 | B1 | * | 2/2010 | Green .................. | B60R 21/233|
|           |    |   |        |                         | 280/730.2  |
| 7,980,590 | B2 | * | 7/2011 | Foubert ................ | B60R 21/18 |
|           |    |   |        |                         | 280/801.1  |
| 9,616,747 | B1 | * | 4/2017 | Breed .................. | B60W 40/02 |

(Continued)

FOREIGN PATENT DOCUMENTS

| EP | 1568549 A1 | * | 8/2005 | ........... B60R 21/231 |
|----|------------|---|--------|--------------------------|
| EP | 2116429 A1 | * | 11/2009 | ............ B60R 21/18 |
| JP | 2020-66425 A |  | 4/2020 | |

*Primary Examiner* — Faye M Fleming
(74) *Attorney, Agent, or Firm* — Posz Law Group, PLC

(57) ABSTRACT

An occupant protection device for protecting an occupant sitting in a seat includes an inflator, a holding member that is adapted to be disposed in front of a pelvic region of the occupant as sitting in the seat, and an airbag that is formed of a sheet material having flexibility and stored in and held by the holding member in a folded form. The airbag is configured to be inflated with an inflation gas fed by the inflator. The airbag includes a shoulder restraining portion that is configured to be deployed in front of shoulders of the occupant, and a supporting inflatable portion that is disposed in a lower end portion of the airbag as deployed for supporting the shoulder restraining portion. The supporting inflatable portion as deployed includes, in the underside, a supported surface that is adapted to be supported by thighs of the occupant.

15 Claims, 32 Drawing Sheets

(56) References Cited

U.S. PATENT DOCUMENTS

2009/0051150 A1* 2/2009 Murakami .............. B60R 21/18
                                                    280/805
2020/0122668 A1   4/2020 Ozaki et al.

\* cited by examiner

FIG. 3
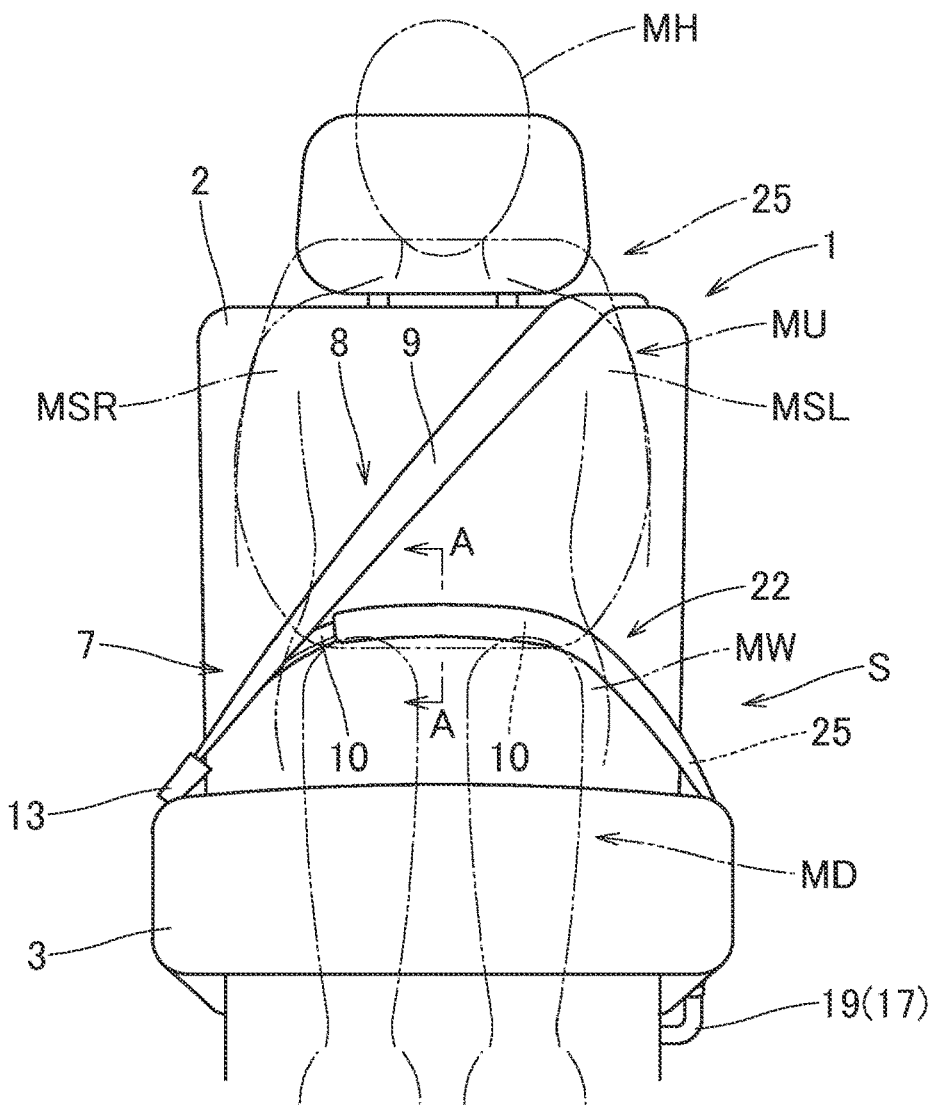
Schematic Sectional View at Line A-A
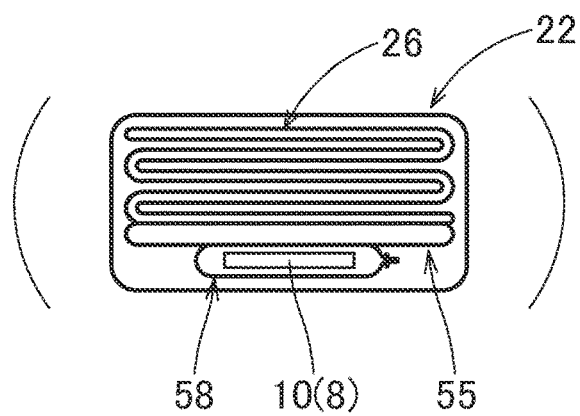

FIG. 13
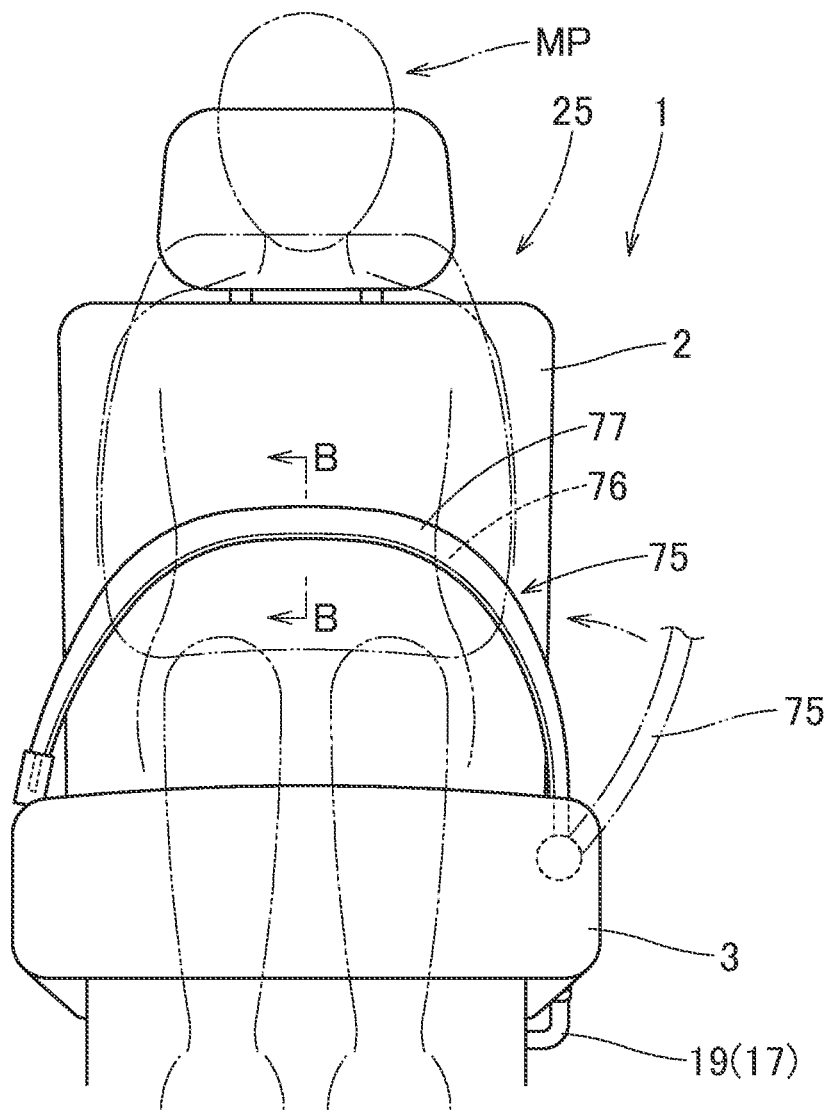
Schematic Sectional View at Line B-B
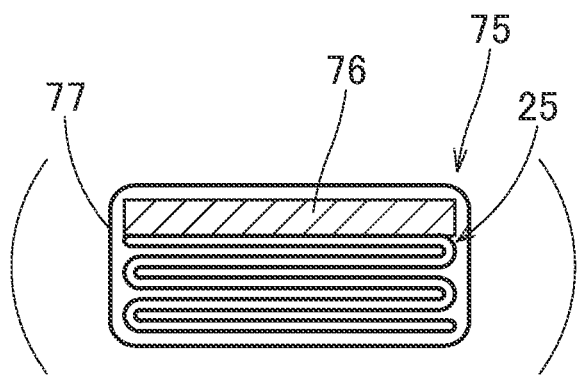

OCCUPANT PROTECTION DEVICE

CROSS REFERENCE TO RELATED APPLICATIONS

The present application claims priority from Japanese Patent Application No. 2020-135990 of Yamada et al., filed on Aug. 11, 2020, and Japanese Patent Application No. 2020-214959 of Yamada et al., filed on Dec. 24, 2020, the entire disclosures of which are incorporated herein by reference.

BACKGROUND

1. Technical Field

The present disclosure relates to an occupant protection device for protecting an occupant sitting in a seat of a vehicle.

2. Description of Related Art

JP 2020-066425 A discloses an occupant protection device for protecting an occupant sitting in a seat of a vehicle. The device includes a seatbelt and an airbag disposed in a lap belt of the seatbelt for restraining the pelvic region of the occupant. The airbag is configured to be inflated with an inflation gas fed from an inflator and adapted to cover the front side of the occupant. In this occupant protection device, the airbag is configured to be inflated into a generally triangular prism whose axis extends generally along a left and right direction of the vehicle, and configured such that a lower surface thereof abuts against the thighs of the occupant. Supported by the thighs of the occupant, the airbag is adapted to restrain a region of the occupant from the thorax to the head with an upper-body-restraining surface which is composed of the rear surface facing toward the upper body of the occupant.

However, in the occupant protection device disclosed in the literature referred to above, the upper-body-restraining surface is substantially flat. With this configuration, when the upper-body-restraining surface is deployed for restraining the upper body of the occupant, the thorax would immediately touch the upper-body-restraining surface. That is, there was a room for improvement in protecting the upper body of the occupant softly.

SUMMARY

An exemplary embodiment of the present disclosure relates to an occupant protection device for protecting an occupant sitting in a seat of a vehicle. The occupant protection device includes: an inflator; a holding member that is adapted to be disposed in front of a pelvic region of an occupant as sitting in a seat; and an airbag that is formed of a sheet material having flexibility, the airbag being stored in and held by the holding member in a folded form, the airbag being configured to protrude from the holding member as disposed in front of the pelvic region of the occupant as sitting in the seat and adapted to cover a front surface of the occupant when fed with an inflation gas from the inflator. The airbag includes: a shoulder restraining portion that is configured to be deployed in front of shoulders of the occupant and adapted to restrain the shoulders at airbag deployment; and a supporting inflatable portion that is disposed in a lower end portion of the airbag as deployed, the supporting inflatable portion being configured to be deployed over thighs of the occupant and adapted to support the shoulder restraining portion, the supporting inflatable portion as deployed including, in an underside thereof, a supported surface that is adapted to be supported by the thighs of the occupant when the airbag arrests the occupant.

BRIEF DESCRIPTION OF DRAWINGS

FIG. 3 is a front view of the seat of FIG. 1 with a seatbelt buckled in.

FIG. 13 is a front view of a seat on which a modification of the occupant protection device is mounted.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 1:
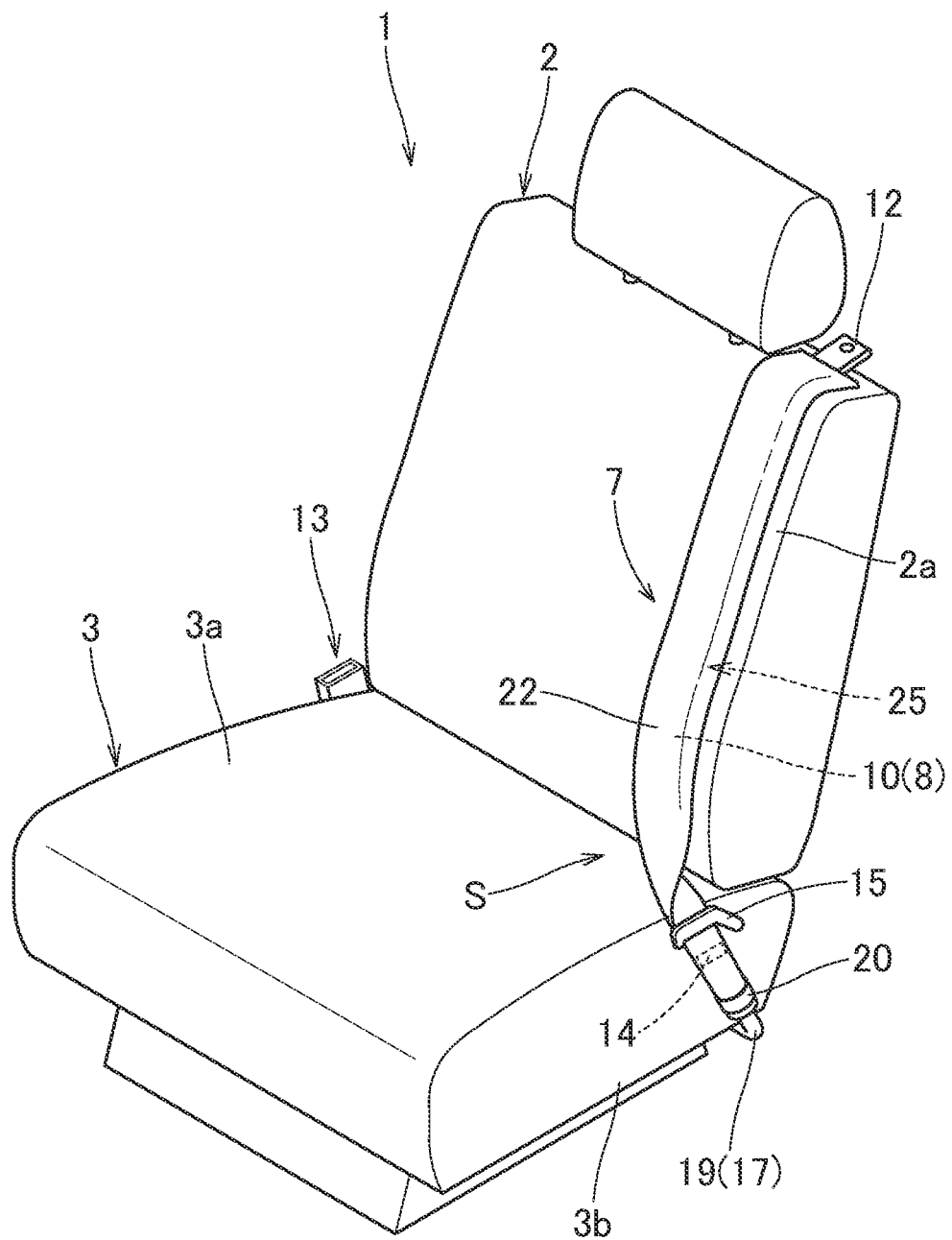
FIG. 1 is a perspective view of a seat on which an occupant protection device in accordance with an exemplary embodiment is mounted.
Figure 2:
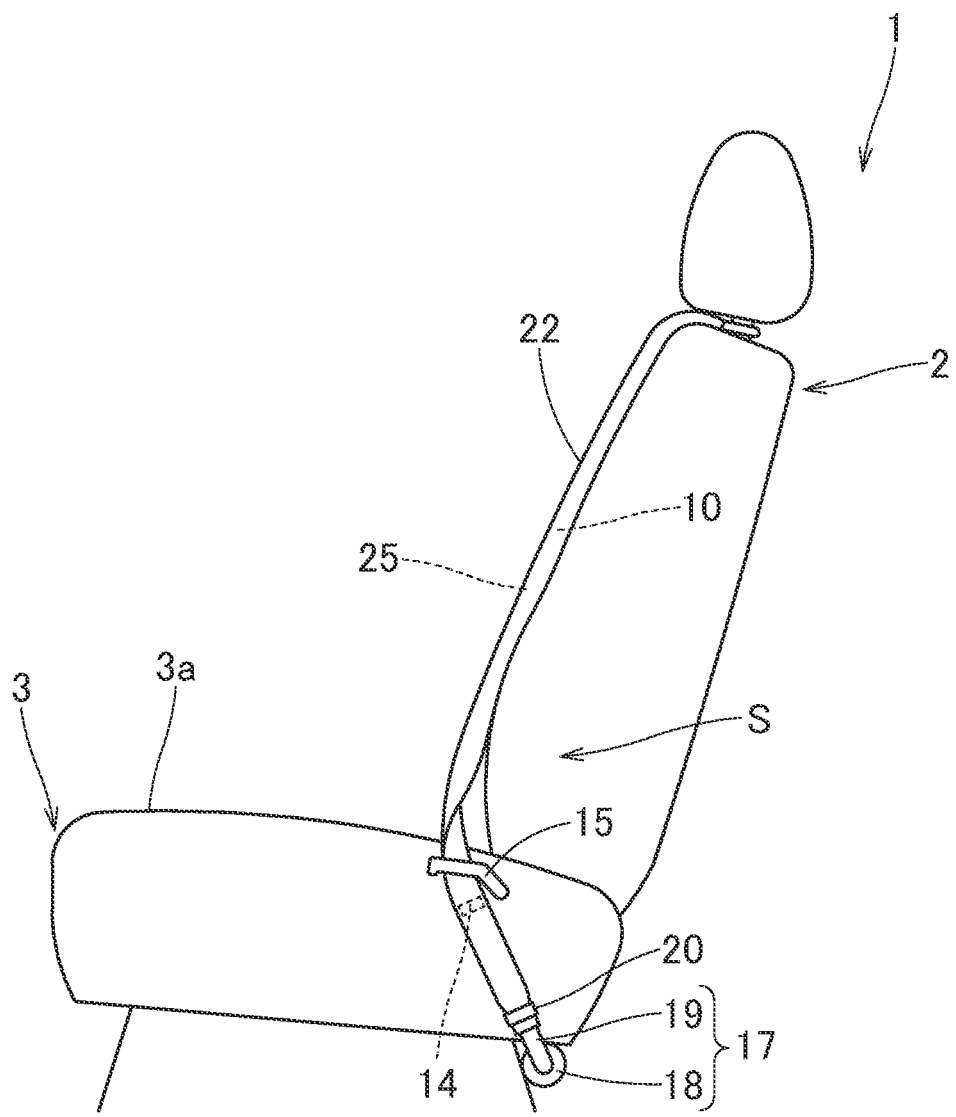
FIG. 2 is a side view of the seat of FIG. 1.
Figure 4:
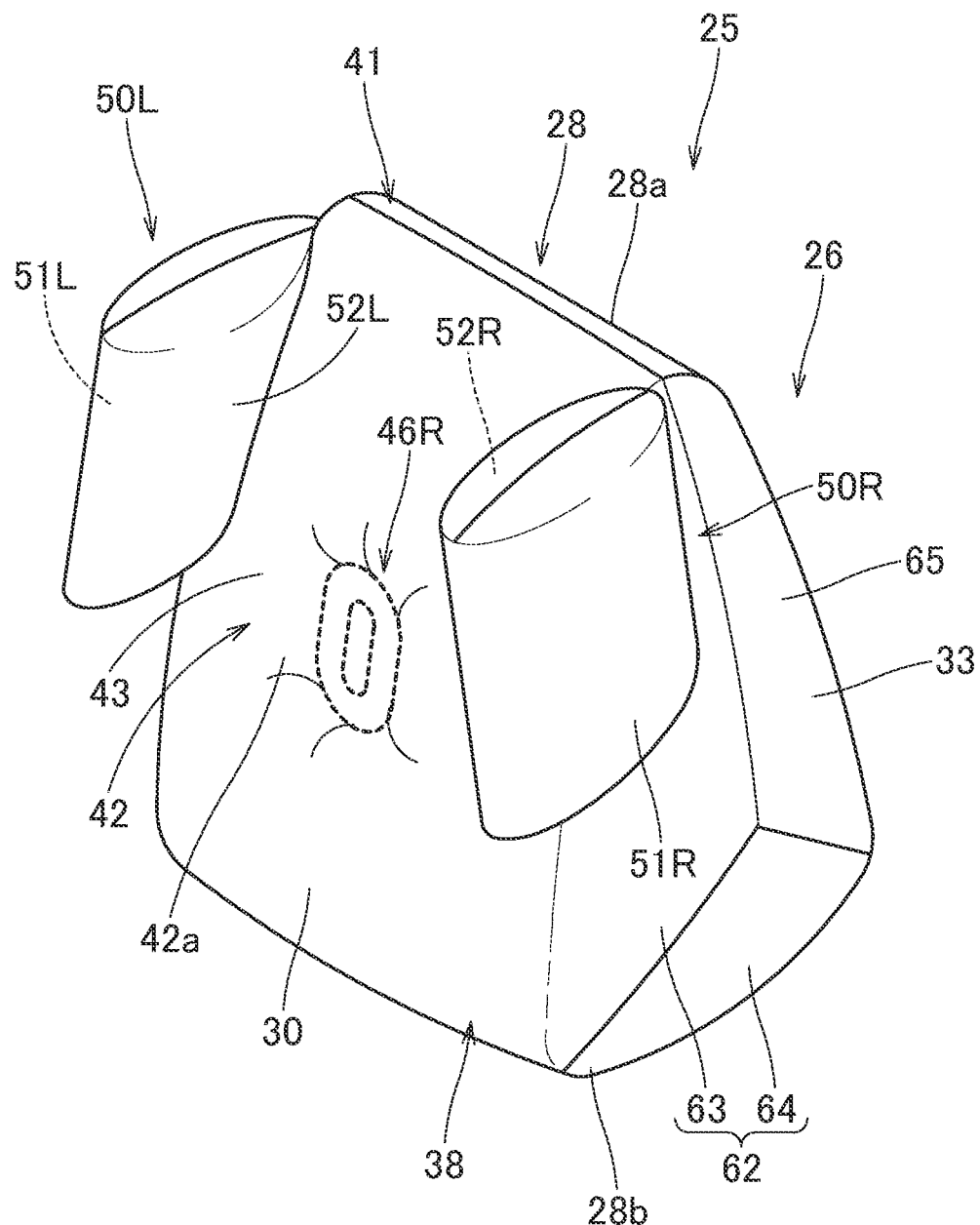
FIG. 4 is a schematic rear perspective view of an airbag used in the occupant protection device in accordance with the exemplary embodiment, the airbag being inflated by itself.

As shown in FIGS. 1 to 3, an occupant protection device S in accordance with an exemplary embodiment is installed in a seat 1 of a vehicle. The occupant protection device S includes a seatbelt 7, an airbag 25, and an inflator 17. The seatbelt 7 constitutes a holding member that holds the airbag 25. The seat 1 includes a seatback 2 and a seat portion 3. Unless otherwise specified, front and rear, up and down, and left and right directions in this specification correspond to front and rear, up and down, and left and right directions of the seat 1.

The seatbelt 7 is installed in the seat 1, in this specific embodiment. The seatbelt 7 includes a belt body 8 for restraining an occupant MP sitting in the seat 1, a tongue plate 12 which is attached to the belt body 8, and a buckle 13 for engagement with the tongue plate 12. A not-shown retractor is located inside of the seatback 2, and the belt body 8 is retained by a reel shaft of the retractor by the first end, and retained, by the second end, by an anchor member 14 (FIGS. 1 and 2) located in a left side of a rear end 3b region of the seat portion 3. More specifically, the belt body 8 is arranged to protrude from a left edge of upper end portion of the seatback 2 such that a later-described lap belt 10, which holds the airbag 25 as will be described below, is exposed on a front surface of the backrest 2 when not worn by the occupant MP, as can be seen in FIGS. 1 and 2. More specifically, the lap belt 10 extends generally along an up and down direction by the left edge 2a of the seatback 2 on the front surface of the backrest 2, when not worn by the occupant MP, as shown in FIG. 1. The belt body 8 includes a lap belt 10 and a shoulder belt 9 which is stored inside of the seatback 2. When the occupant wears the seatbelt 7 by bringing the tongue plate 12 into engagement with the buckle 13, the lap belt 10 extends generally in a left and right direction between the anchor member 14 and buckle 13 and restrains the lower body MD (pelvic region MW) of the occupant MP while the shoulder belt 9 extends diagonally from the left upper end portion of the seatback 2 to the buckle 13 and restrains the upper body MU (shoulder MS to thorax MB) of the occupant MP, as can be seen in FIG. 3. In this specific embodiment, the lap belt 10 that is disposed in front of the pelvic region MW of the occupant MP when worn by the occupant and a later-described cover 22 constitute the holding member that houses and holds the airbag 25.

The inflator 17 is disposed in the seat 1. More specifically, in this specific embodiment, the inflator 17 is disposed farther downward than a seat surface 3a of the seat 1. More particularly, as can be seen in FIG. 2, the inflator 17 includes a generally cylindrical inflator body 18 which extends generally in a left and right direction beneath the seat portion 3 in a vicinity of the back of the seat 1, though not depicted in detail, and a pipe 19 which extends from the inflator body 18 for feeding the airbag 25 with an inflation gas. The pipe 19 is made from metal and extends from the inflator body 18. The leading end of the pipe 19 is located in a vicinity of a border between the seat portion 3 and seatback 2 in the left side of the seat 1, and is connected to a later-described conduit portion 55 of the airbag 25 by a clamp 20.

The airbag 25 is folded in an elongated shape and held by the lap belt 10 in the folded state while covered by a cover 22. More specifically, as can be seen in FIG. 3, the airbag 25 as folded is disposed on an upper side of the lap belt 10 of the seatbelt 7 as worn by the occupant MP and covered by the cover 22. The airbag 25 is disposed in the lap belt 10. In other words, in this specific embodiment, the airbag 25 as folded is stored in a void space between the lap belt 10 and cover 22. That is, the lap belt 10 and the cover 22 constitute the holding member. In the not-worn state of the seatbelt 7 as can be seen in FIG. 1, the airbag 25 is disposed on a back side of the lap belt 10 to face the seatback 2. The cover 22 is designed to break at airbag deployment.

As can be seen in FIGS. 4 to 7, the airbag 25 includes a bag body 26, a conduit portion 55 which is connected with the inflator 17 for delivering an inflation gas to the bag body 26, and a mounting portion 58 which attaches the bag body 26 to the lap belt 10.

The bag body 26 of this specific embodiment includes a main inflatable portion 28 that is designed to cover the front side of the upper body MU of the occupant MP when deployed, and a pair of shoulder restraining portions 50L, 50R that are designed to restrain the left and right shoulders MSL, MSR of the occupant MP when deployed.

The main inflatable portion 28 is configured to be inflated into a generally triangular prism whose axis extends generally in a left and right direction. The main inflatable portion 28 as fully inflated has a generally rectangular shape elongated in an up and down direction when viewed from the front or back. The main inflatable portion 28 of this embodiment includes a supporting inflatable portion 38 that is composed of a lower end 28b region of the main inflatable portion 28 as deployed and adapted to cover upper surfaces of thighs MTL, MTR of the occupant MP, a head protecting portion 41 that is composed of an upper end 28a region of the main inflatable portion 28 as deployed and adapted to protect the head MH of the occupant MP, and a thorax protecting region 42 that is composed of a region above the supporting inflatable portion 38 and between the supporting inflatable portion 38 and head protecting portion 41 and adapted to protect the thoracic region MB of the occupant MP.

An outer shell of the main inflatable portion 28 includes a front wall 29 which is configured to be deployed in the front side facing away from the occupant MP, a rear upper wall 30 and a rear lower wall 31 which are configured to be deployed towards the occupant MP, and a left wall 32 and a right wall 33 which are configured to be opposed to one another in the left and right direction at airbag deployment.

The rear upper wall 30 is designed to cover a region of the occupant MP from the abdomen MA to a lower portion of the head MH when the airbag 25 is deployed. The rear upper wall 30 extends generally along an up and down direction in the rear side of the main inflatable portion 28 as deployed. An area of the rear upper wall 30 except the lower end portion to be deployed in front of the abdomen MA (in other words, a rear surface 42a of the thorax protecting region 42) constitutes a thorax arresting surface 43 that is adapted to arrest the thoracic region MB of the occupant MP as arrested by the shoulders MSL, MSR by the shoulder restraining portions 50L, 50R. That is, the thorax arresting surface 43 extends generally along the up and down direction and is continuous with a front portion of each of the left and right shoulder restraining portions 50L, 50R.

Figure 5:
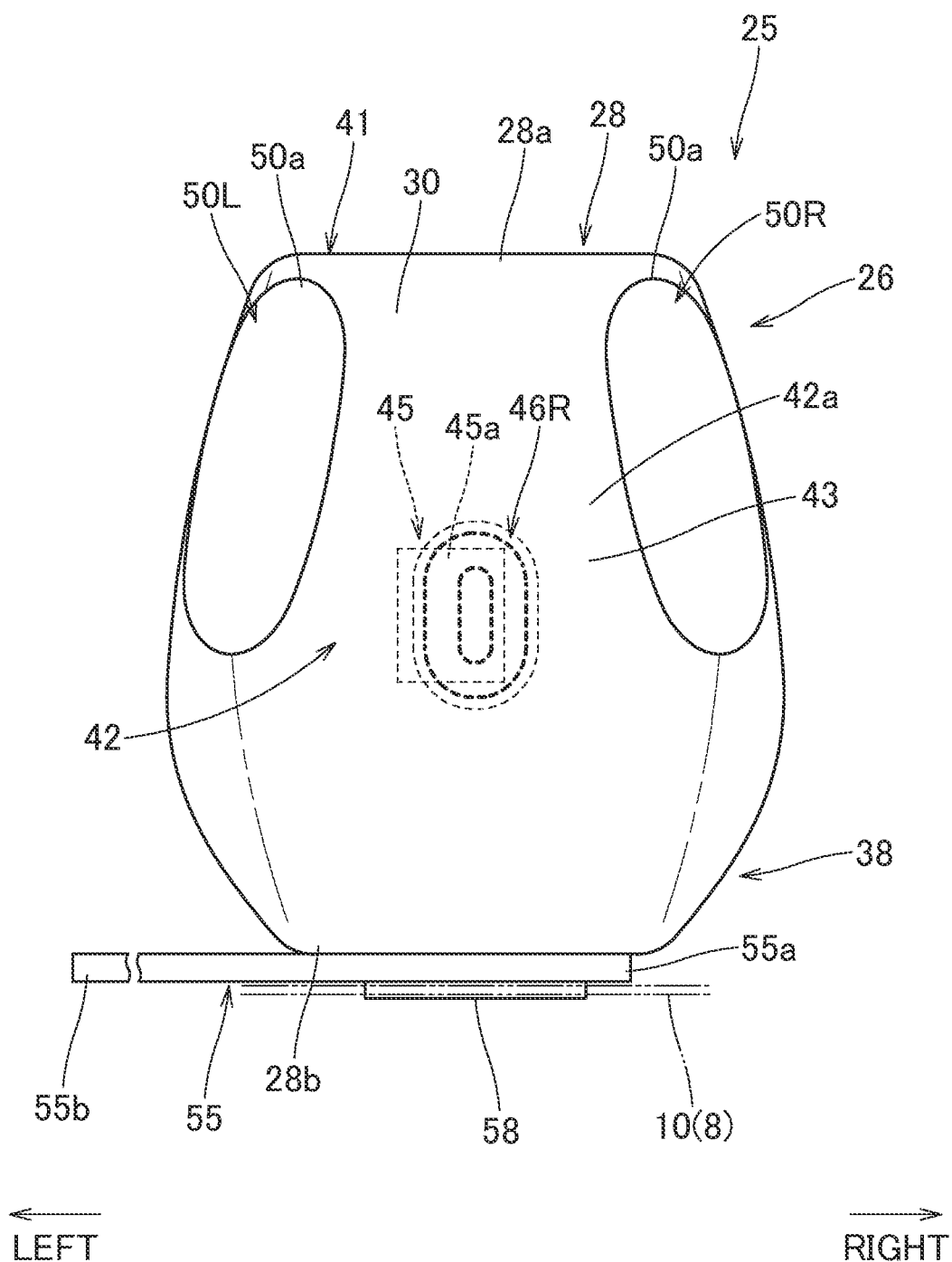
FIG. 5 is a rear view of the airbag of FIG. 4.
Figure 6:
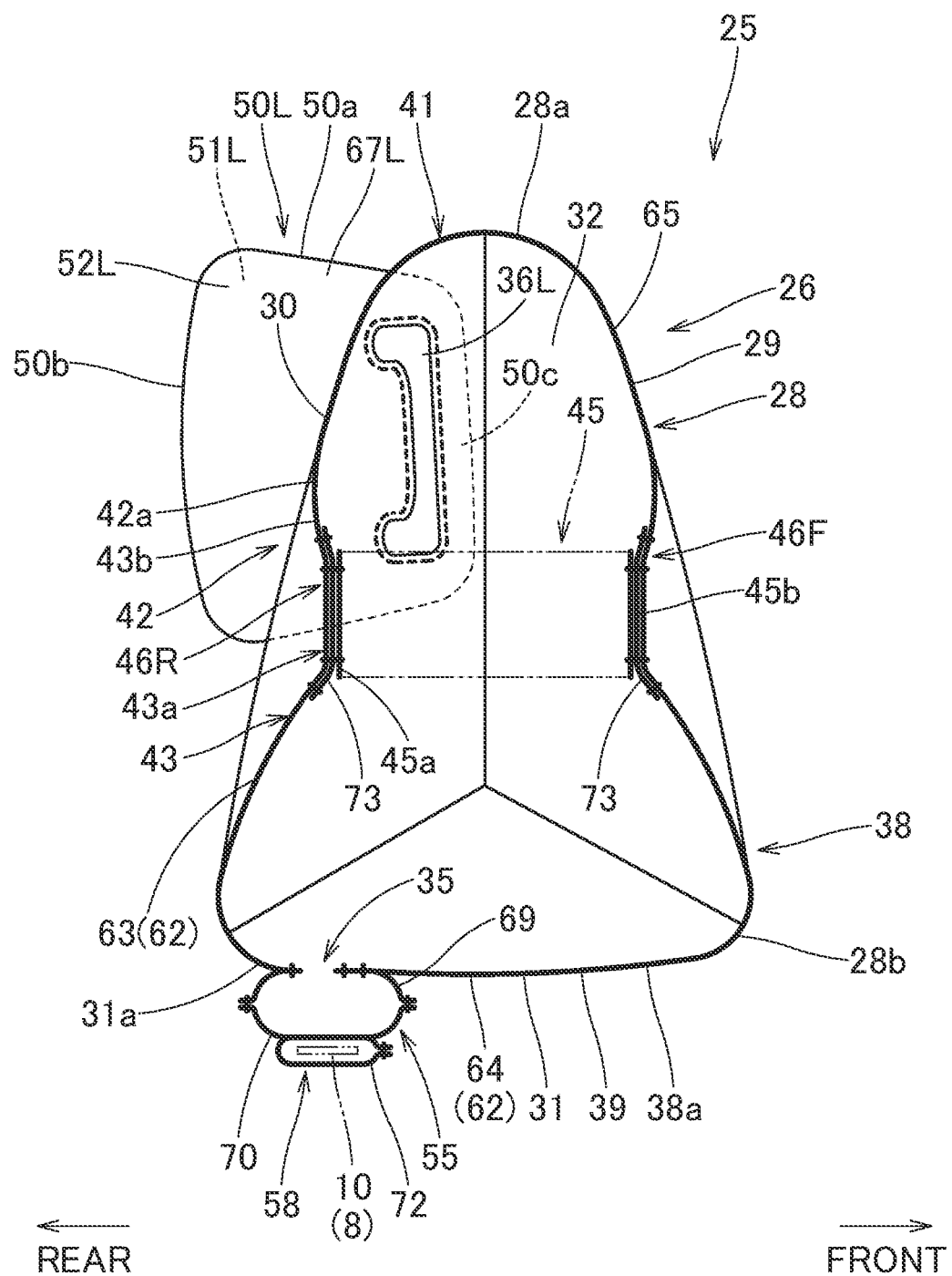
FIG. 6 is a schematic vertical sectional view of the airbag of FIG. 4 taken along a front and rear direction.
Figure 7:
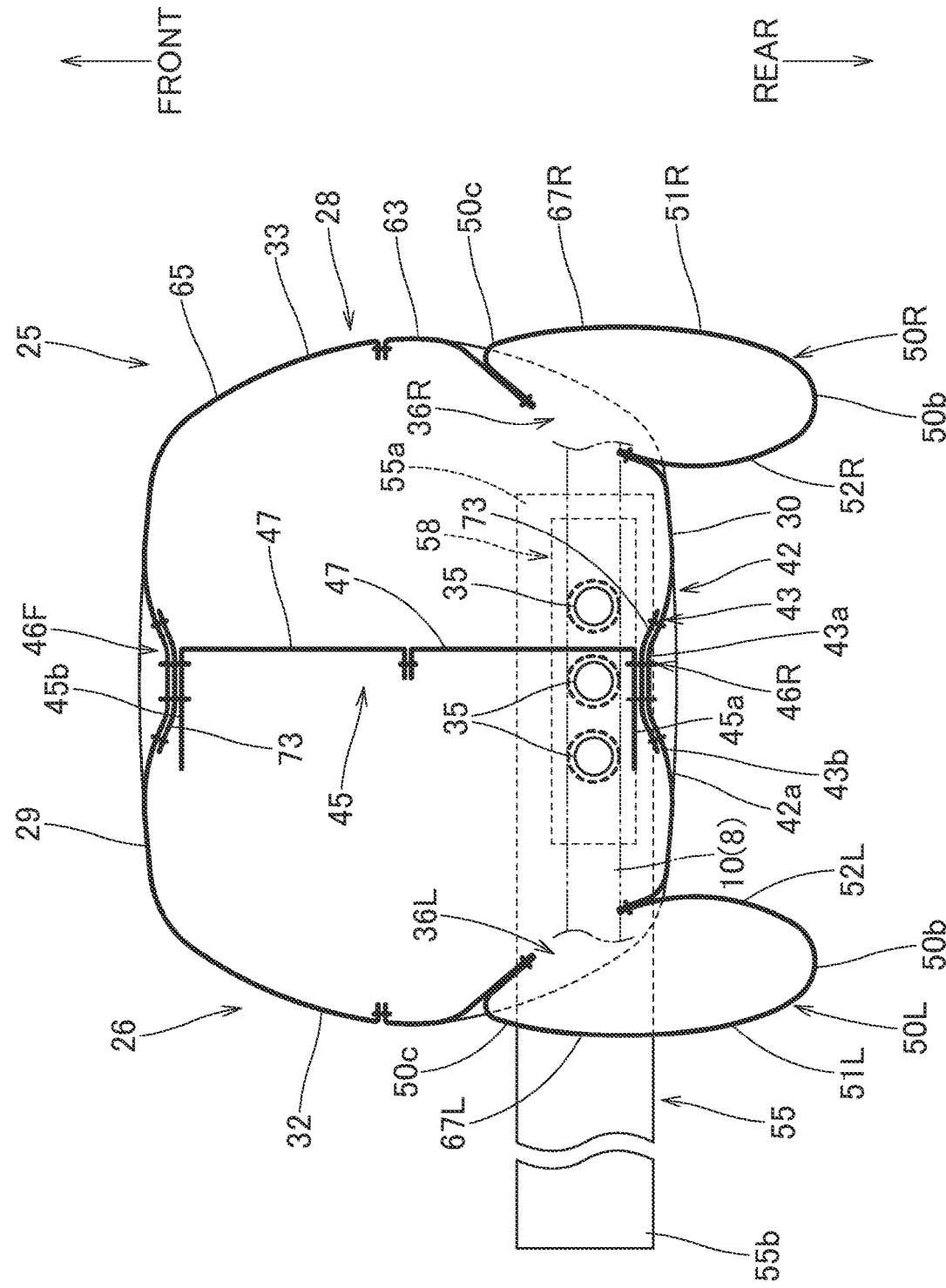
FIG. 7 is a schematic horizontal sectional view of the airbag of FIG. 4 taken along a front and rear direction.
Figure 8:
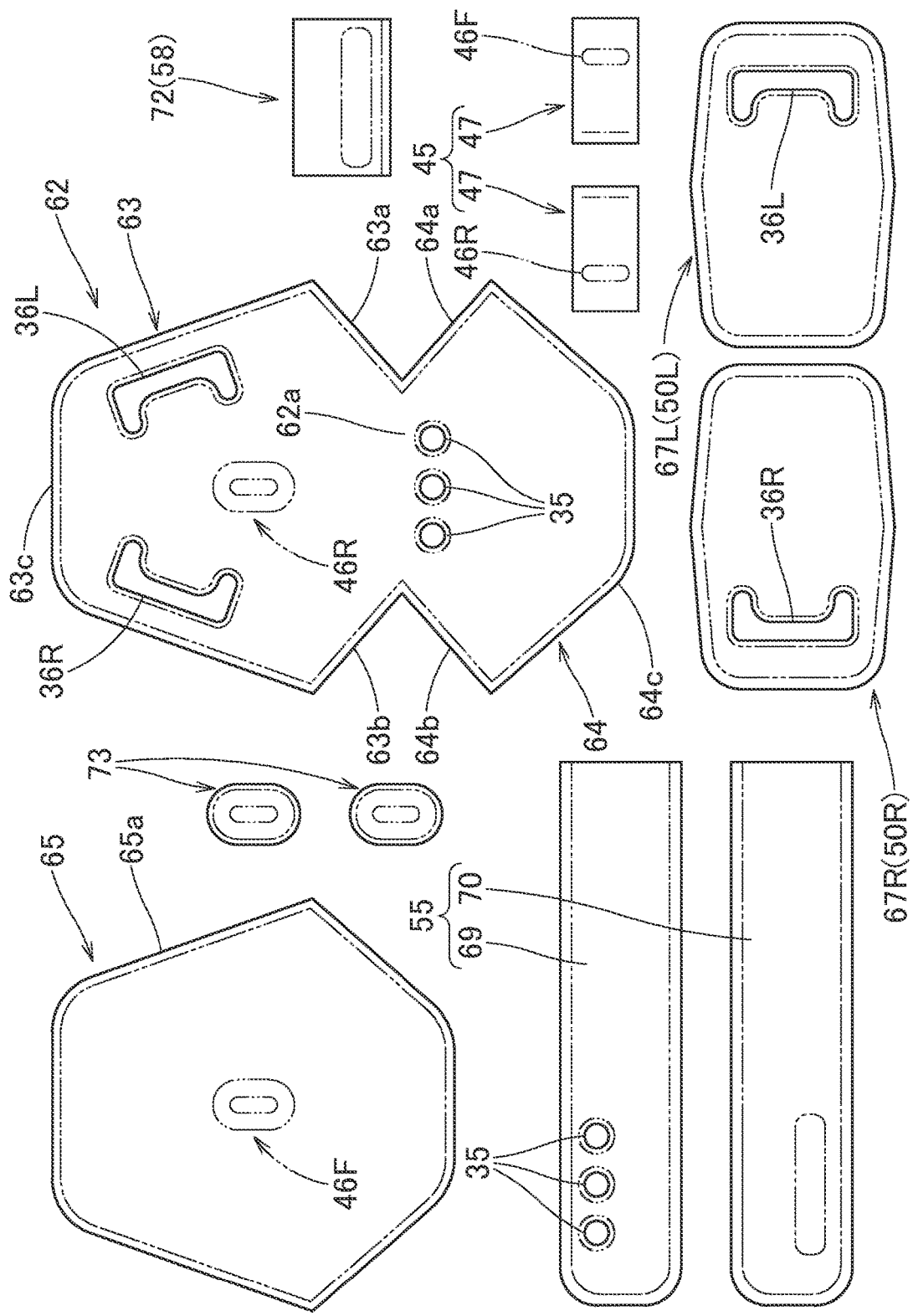
FIG. 8 depicts base members of the airbag of FIG. 4 by plan.

In the airbag 25 in accordance with the exemplary embodiment, as can be seen in FIGS. 6 and 7, the main inflatable portion 28 internally includes a regulating tether 45 that connects the rear upper wall 30 and front wall 29 and extends along a front and rear direction for regulating a distance between the rear upper wall 30 and the front wall 29. A joint 46R that connects the rear end 45a of the regulating tether 45 to the rear upper wall 30 is disposed in a vicinity of the center in the up and down direction and in the left and right direction of the rear upper wall 30. A joint 46F that connects the front end 45b of the regulating tether 45 to the front wall 29 is disposed in a vicinity of the center in the up and down direction and in the left and right direction of the front wall 29. When the airbag 25 of this embodiment is inflated, a portion of the rear upper wall 30 in a vicinity of the joint 46R of the regulating tether 45 is recessed forward. The regulating tether 45 is formed into a band shape, and disposed in the airbag 25 such that the width direction extends along the up and down direction. The joint 46R is composed of a substantially oval sewn seam elongated in the up and down direction. Likewise, the joint 46F is composed of a substantially oval sewn seam elongated in the up and down direction. In this specific embodiment, the joint 46F and joint 46R that joint the regulating tether 45 to the main inflatable portion 28 are each reinforced with a reinforcing cloth 73, as can be seen in FIGS. 6 to 8. More particularly, each of the joint 46R and joint 46F has a double circle shape composed of a seam that sews an entire outer circumferential edge of the reinforcing cloth 73 to the front wall 29/rear upper wall 30 and a seam that sews the front end 45b/rear end 45a of the regulating tether 45 itself to the front wall 29/rear upper wall 30, as can be seen in FIGS. 4, 5, 8 and 9. In this specific embodiment, the regulating tether 45 is composed of two base members 47.

Figure 9:
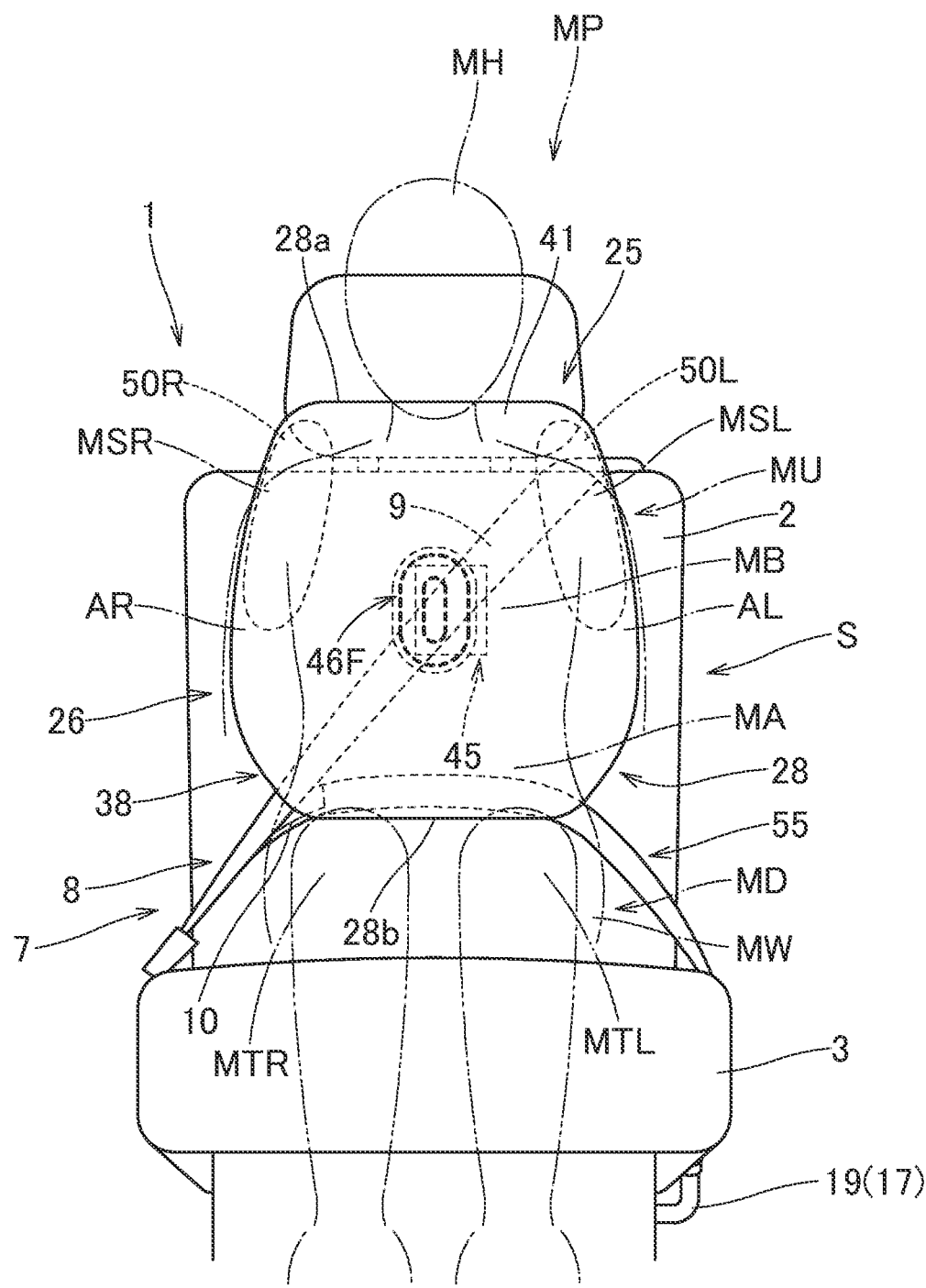
FIG. 9 is a front view of the seat at airbag deployment in the occupant protection device in accordance with the exemplary embodiment.
Figure 10:
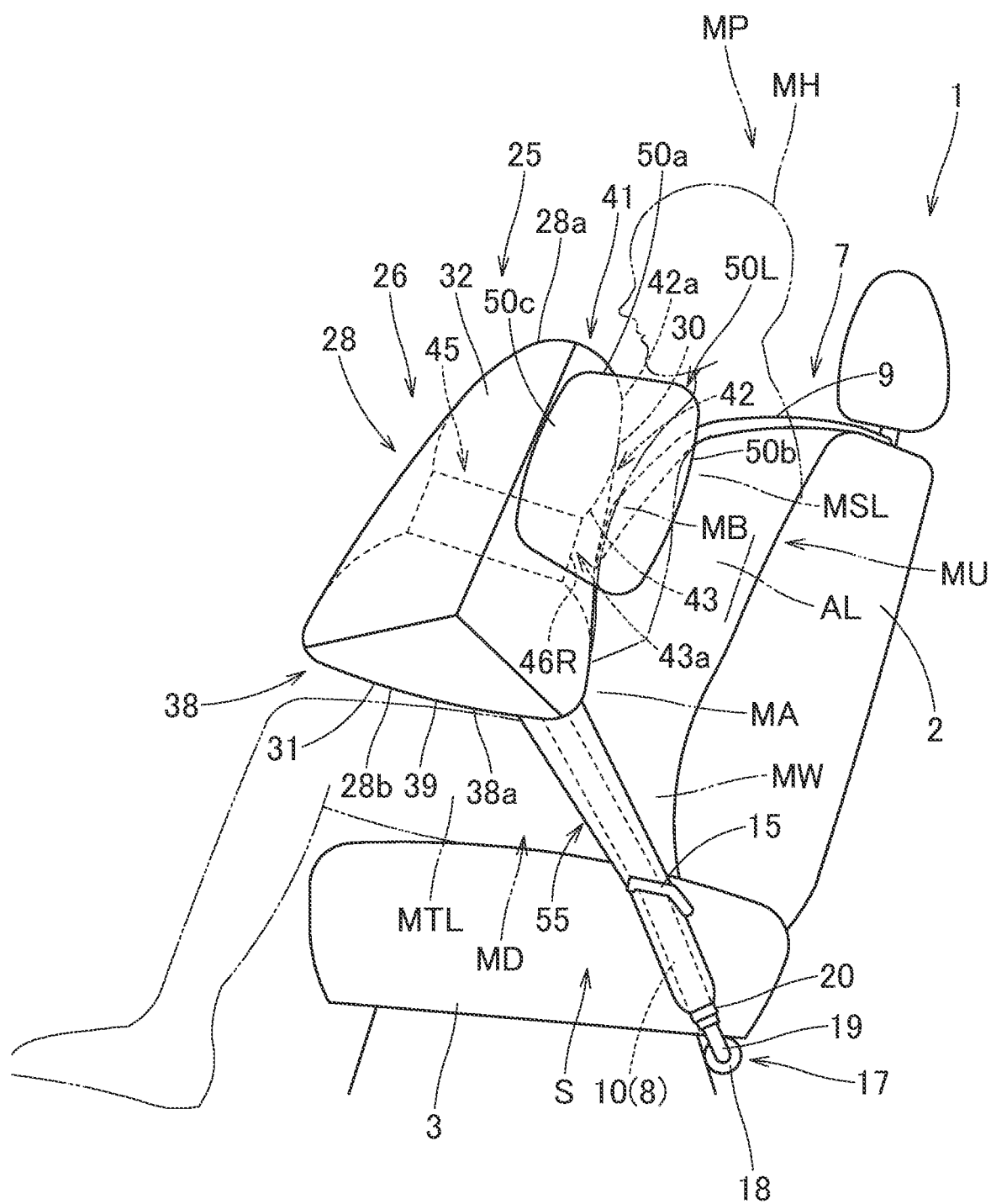
FIG. 10 is a side view of the seat at airbag deployment in the occupant protection device in accordance with the exemplary embodiment.

As can be seen in FIG. 6, the regulating tether 45 of this embodiment is disposed in the airbag 25 such that an upper half area thereof overlaps with the shoulder restraining portions 50L, 50R in the left and right direction as viewed from the left or right of the airbag 25 as inflated. With this configuration, the joint 46R that connects the rear end 45a of the regulating tether 45 to the rear upper wall 30 is disposed substantially at the center in the up and down direction and in the left and right direction of the thorax arresting surface 43, at a position to be a vicinity of the center in the left and right direction of the thoracic region MB of an occupant MP corresponding to AM50 dummy, at airbag deployment, as can be seen in FIGS. 9 and 10. In other words, the thorax arresting surface 43 (or the rear upper wall 30) as deployed is provided with a recessed portion 43a that is recessed forward substantially at the center in the up and down direction and in the left and right direction, which corresponds to the vicinity of the center in the left and right direction of the thoracic region MB.

The rear lower wall 31 is designed to extend generally along the front and rear direction, along the thighs MTL, MTR of the occupant MP at airbag deployment. The rear lower wall 31 constitutes a lower surface 38a of the supporting inflatable portion 38. In other words, the rear lower wall 31 constitutes a supported surface 39 that is to be supported by the left and right thighs MTL, MTR of the occupant MP when the airbag 25 arrests him. More specifically, the rear lower wall 31 is provided, in a vicinity of the rear end 31a, with at least one communication hole 35 that provides gas communication between the main inflatable portion 28 and the conduit portion 55, as can be seen in FIGS. 6 and 7. Therefore, to be more exact, the supported surface 39 is composed of a region of the rear lower wall 31 located farther forward than the conduit portion 55.

Figure 11:
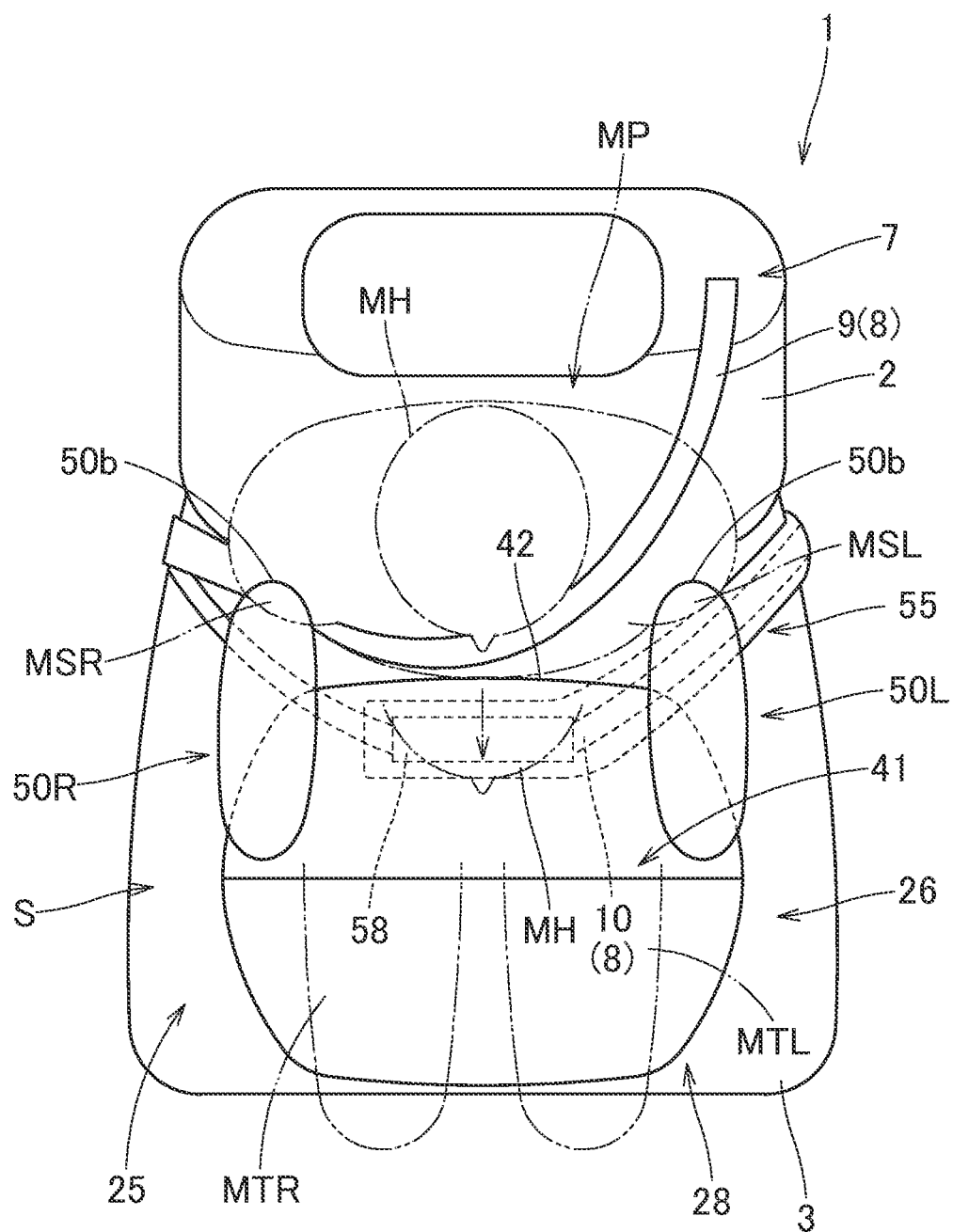
FIG. 11 is a plan view of the seat at airbag deployment in the occupant protection device in accordance with the exemplary embodiment.
Figure 12:
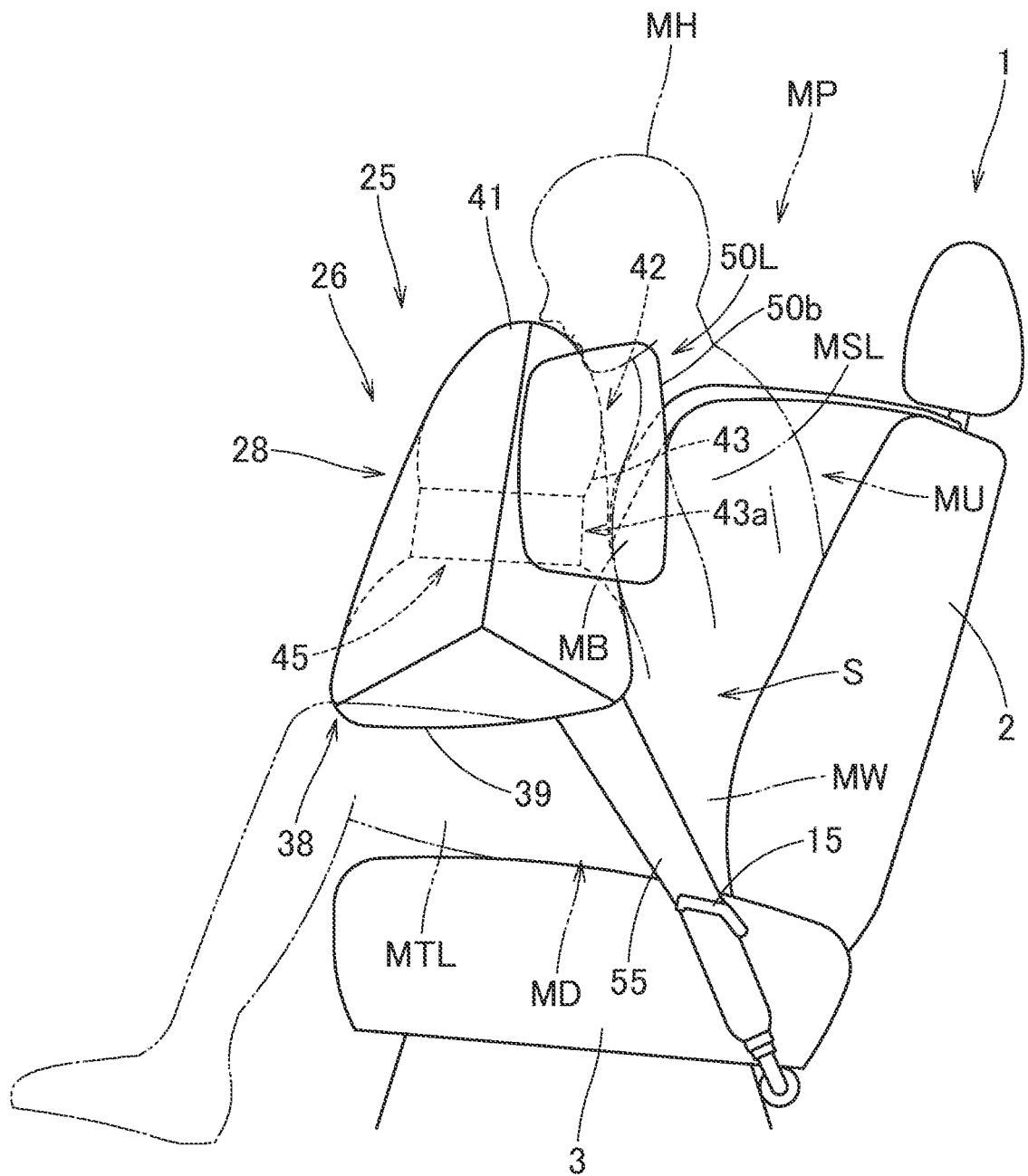
FIG. 12 is a side view of the occupant protection device in accordance with the exemplary embodiment depicting the way the airbag as deployed restrains an occupant.

In this embodiment, a width in the up and down direction and a width in the left and right direction of the main inflatable portion 28 as fully inflated are set such that the rear upper wall 30 is able to cover substantially an entirety of the upper body MU of the occupant MP except the head MH. A width in the front and rear direction of the main inflatable portion 28 as fully inflated is set such that the rear lower wall 31 (or the supported surface 39) is able to cover the upper surfaces of the thighs MTL, MTR widely in the front and rear direction to vicinities of the knees, as can be seen in FIGS. 9 to 11. More specifically, as shown in FIG. 10, the main inflatable portion 28 of this embodiment is designed such that the upper end 28a as deployed is disposed slightly farther downward than the head MH of an occupant MP corresponding to AM50 dummy. That is, in the occupant protection device S of the exemplary embodiment, the airbag 25 is designed such that the head protecting portion 41 for protecting the head MH of the occupant MP is disposed at a front lower position of the head MH when deployed.

The two shoulder restraining portions 50L, 50R for restraining the left and right shoulders MSL, MSR of an occupant MP are disposed in the left and right portions of the main inflatable portion 28. The shoulder restraining portions 50L, 50R are designed to protrude farther rearward than the main inflatable portion 28 in an identical shape each at a vicinity of left/right edge of the upper end 28a portion of the main inflatable portion 28 so that the rear ends 50b are each deployed in a vicinity of the front surface of left/right shoulder MSL, MSR of the occupant MP sitting in the seat 1, as can be seen in FIGS. 10 and 11. As can be seen in FIG. 7, each of the shoulder restraining portions 50L, 50R as deployed includes an inner wall 51L/51R which faces towards the main inflatable portion 28, and an outer wall 52L/52R which faces away from the main inflatable portion 28. Each of the shoulder restraining portions 50L, 50R is designed to be inflated into a substantially rectangular board extending generally along the up and down direction (FIG. 6) so that they are able to restrain the shoulder MSL/MSR widely in the up and down direction. Each of the shoulder restraining portions 50L, 50R is in gas communication with the main inflatable portion 28 via a communication hole 36L/36R disposed in a vicinity of the front end 50c. By being connected to the main inflatable portion 28 by the periphery of the communication hole 36, each of the shoulder restraining portions 50L, 50R is joined to the main inflatable portion 28 and supported by the main inflatable portion 28 (that is, by the supporting inflatable portion 38) at airbag deployment. As shown in FIG. 6, each of the communication holes 36L, 36R is formed into an elongated shape generally along the up and down direction. More specifically, each of the communication holes 36L, 36R has a substantially U shape whose upper and lower ends extend rearward. Each of the shoulder restraining portions 50L, 50R as inflated slightly expands in width in the up and down direction towards the rear end 50b which is to butt the shoulder MSL/MSR of the occupant MR. More particularly, each of the shoulder restraining portions 50L, 50R is designed such that, at airbag deployment, the upper end 50a substantially coincides with the upper end 28a of the main inflatable portion 28, the width in the up and down direction is approximately a half of the width in the up and own direction of the main inflatable portion 28, and an approximately rear half area thereof protrudes farther rearward than the rear upper wall 30 (i.e. the thorax arresting surface 43) of the main inflatable portion 28, as can be seen in FIG. 6. The shoulder restraining portions 50L, 50R are each designed such that the rear end 50b is deployed in proximity to the left/right shoulder MSL/MSR of the occupant MP and covers a substantially entire area in the up and down direction of the front surface of the shoulder MSL/MSR to upper arm AL/AR, as can be seen in FIGS. 9 to 11.

The conduit portion 55 is coupled to the bag body 26 at the root end portion 55a, which is closed, and connected to the pipe 19 of the inflator 17 at the leading end portion 55b. As can be seen in FIG. 9, the conduit portion 55 is designed to extend generally along a left and right direction, generally along the lap belt 10 at airbag deployment. As can be seen in FIGS. 5, and 7, the root end portion 55a of the conduit portion 55 is disposed in the underside of the main inflatable portion 28 of the bag body 26 as deployed, where the conduit portion 55 is in gas communication with the main inflatable portion 28 via the communication holes 35.

The mounting portion 58 which attaches the bag body 26 to the lap belt 10 is located on an underside of the root end portion 55a of the conduit portion 55. The mounting portion 58 is formed into a tube extending generally along the left and right direction, i.e. generally along the lap belt 10, so that the lap belt 10 goes there through as can be seen in FIGS. 5 and 6, and is sewn to the underside of the root end portion 55a of the conduit portion 55. With the configuration that the lap belt 10 is passed through the mounting portion 58, the airbag 25 is held by the lap belt 10.

The airbag 25 is formed by jointing circumferential edges of a plurality of base cloths cut in predetermined shapes. As can be seen in FIG. 8, the airbag 25 of this embodiment is composed of an occupant-side panel 62 and a front panel 65 for forming the main inflatable portion 28 in combination, two panels 67L and 67R for respectively forming the shoulder restraining portions 50L and 50R, two panels 69 and 70 for forming the conduit portion 55 in combination, a panel 72 for forming the mounting portion 58, two base members 47 for forming the regulating tether 45 in combination, and two reinforcing cloths 73 for respectively reinforcing the joint 46F and joint 46R of the regulating tether 45. The occupant-side panel 62, front panel 65, panels 67L and 67R, panels 69 and 70, panel 72, base members 47 and reinforcing cloths 73 are each made of a flexible fabric woven with polyester yarns, polyamide yarns or the like.

The occupant-side panel 62 mainly constitutes an area of the main inflatable portion 28 from the rear lower wall 31 to the rear upper wall 30 that are deployed towards the occupant MP at airbag deployment. More specifically, the occupant-side panel 62 includes a lower portion 64 that mainly forms the rear lower wall 31, and an upper portion 63 that mainly forms the rear upper wall 30. More particularly, the lower portion 64 forms the rear lower wall 31 and a rear lower area of each of the left wall 32 and right wall 33, while the upper portion 63 forms the rear upper wall 30 and a rear upper area of each of the left wall 32 and right wall 33. Each of the lower portion 64 and upper portion 63 is formed into a substantially hexagonal outer shape. The occupant-side panel 62 has such a shape that the lower portion 64 and the upper portion 63 are jointed to one another by a side, by a joint portion 62a, as shown in FIG. 8.

The front panel 65 mainly constitutes the front wall 29, more particularly, the front wall 29 and a front area of each of the left wall 32 and right wall 33, of the main inflatable portion 28 as inflated. The front panel 65 has a substantially hexagonal outer shape. More specifically, the outer shape of the front panel 65 is a hexagonal shape substantially identical to a shape that is formed by front edges 63c and 64c of the occupant-side wall 62 with the rear left edges 63a, 64a and rear right edges 63b, 64b of the lower portion 64 and upper portion 63 joined together. The main inflatable portion 28 is formed into a bag shape by jointing an outer circumferential edge 65a of the front panel 65 and the front edges 63c and 64c of the lower portion 64 and upper portion 63 of the occupant-side panel 62 with the rear left edges 63a, 64a and rear right edges 63b, 64b joined together.

The panels 67L and 67R for forming the shoulder restraining portions 50L and 50R each has such a substantially rectangular shape that the inner wall 51L/51R and the outer wall 52L/52R are jointed by respective rear edge. Each of the panels 67L, 67R is formed into the shoulder restraining portion 50L/50R by being doubled and sewn by the circumferential edge. The panels 69 and 70 for forming the conduit portion 55 are identical in outer shape. The panel 72 for forming the mounting portion 58 has a substantially rectangular shape, and forms the mounting portion 58 by being doubled and sewn by opposite edges in the width direction.

When the inflator 17 of the occupant protection device S in accordance with the exemplary embodiment as mounted on the vehicle is actuated in a state where the occupant MP is seated in the seat 1 wearing the seatbelt 7, an inflation gas emitted from the inflator 17 will flow into the bag body 26 via the conduit portion 55, so that the bag body 26 will break the cover 22 and protrudes forward and upwardly from the lap belt 10, and be deployed as depicted in FIG. 3 (with dashed-and-double-dotted lines) and FIGS. 9 to 11.

With the occupant protection device S in accordance with the exemplary embodiment, when the occupant MP is going to move at airbag deployment in such a manner that the upper body MU moves towards the lower body MD, the shoulder restraining portions 50L, 50R respectively deployed in front of the left and right shoulders MSL, MSR will restrain the shoulders MSL, MSR and prevent the upper body MU from moving forward. That is, since the shoulder restraining portions 50L, 50R arrest the left and right shoulders MSL, MSR and absorb the kinetic energy of the upper body MU moving forward, the airbag 25 is able to prevent the upper body MU of the occupant MP from tilting forward. Further, the occupant protection device S includes, in the lower end 28b portion of the airbag 25 as deployed, the supporting inflatable portion 38 that is configured to be deployed over thighs MTL, MTR of the occupant MP and adapted to support the shoulder restraining portions 50L, 50R. This supporting inflatable portion 38 as inflated is supported by the left and right thighs MTL, MTR of the occupant MP by a wide area of the supported surface 39 which is disposed in the underside 38a of the supporting inflatable portion 38. With this configuration, even if the upper body MU of the occupant MP whose shoulders MSL, MSR have been restrained by the shoulder restraining portions 50L, 50R is going to move toward the lower body MD further, the supporting inflatable portion 38 will support lower portions of the shoulder restraining portions 50L, 50R robustly so that the shoulder restraining portions 50L, 50R are able to restrain the left and right shoulders MSL, MSR steadily. Therefore, the airbag 25 is able to restrain the upper body MU of the occupant MP softly and adequately.

Therefore, the occupant protection device S in accordance with the exemplary embodiment is able to restrain the upper body MU of the occupant MP softly and adequately.

In the occupant protection device S in accordance with the exemplary embodiment, the airbag 25 as inflated and deployed further includes, in a region above the supporting inflatable portion 38, the thorax arresting surface 43 that extends substantially along the up and down direction in a rear end portion of the airbag 25. The airbag 25 as deployed further includes the head protecting portion 41 above the thorax arresting surface 43 in a vicinity of the upper end 28a of the airbag 25. With this configuration, the head protecting portion 41 will arrest the head MH of the occupant MP who has been restrained by the shoulders MSL, MSR by the shoulder restraining portions 50L, 50R, then the thorax arresting surface 43 will arrest the thoracic region MB. That is, the airbag 25 is able to arrest and protect not only shoulders MSL, MSR but also head MH and thoracic region MB of the occupant MP. More particularly, in the occupant protection device S in accordance with the exemplary embodiment, the shoulder restraining portions 50L, 50R are configured to protrude rearward largely from the rear upper wall 30 (i.e. thorax arresting surface 43) of the main inflatable portion 28 and be deployed such that the rear ends 50b are each deployed in proximity to the front surface of left/right shoulders MSL, MSR of the occupant MP at airbag deployment. The main inflatable portion 28 is configured such that the head protecting portion 41 is deployed at a front lower position of the head MH of the occupant MP sitting in the seat 1. Further, each of the shoulder restraining portions 50L, 50R is configured to be inflated into a substantially rectangular board extending generally along the up and down direction so that it is able to cover the front surfaces of the shoulders MSL, MSR and upper arms AL, AR. With the occupant protection device S in accordance with the exemplary embodiment, accordingly, since the shoulder restraining portions 50L, 50R are able to firstly arrest the shoulders MSL, MSR by a wide area quickly in an initial stage of airbag deployment, the airbag 25 is able to prevent the occupant MP from moving forward relative to the seat 1 adequately. Then, when the occupant MP is going to tilt forward such that the upper body MU moves toward the lower body MD, the upper body MU will behave in such a manner as to compress and deform the shoulder restraining portions 50L, 50R, thus the shoulder restraining portions 50L, 50R will be able to absorb the kinetic energy of the upper body MU tilting forward adequately. Then the head protecting portion 41 will arrest the head MH moving forward and downward along with the upper body 41 which tilts forward while the kinetic energy thereof is being absorbed, then the thorax arresting surface 43 will arrest the thoracic region MB.

In the occupant protection device S in accordance with the exemplary embodiment, moreover, the airbag 25 internally includes the regulating tether 45 that is adapted to prevent the thorax arresting surface 43 (or rear upper wall 30) from protruding rearward at airbag deployment. At airbag deployment, the regulating tether 45 prevents the thorax arresting surface 43 from protruding rearward excessively, in other words, helps maintain a clearance in the front and rear direction between the thorax arresting surface 43 and the rear ends 50b of the shoulder restraining portions 50L, 50R which contact with the shoulders MSL, MSR of the occupant MP, so that the airbag 25 is able to protect the thoracic region MB of the occupant MP steadily and softly by the thorax arresting surface 43 after restraining the shoulders with the shoulder restraining portions 50L, 50R. In the exemplary embodiment, especially, the thorax arresting surface 43 (or rear upper wall 30) in the airbag 25 as deployed is provided with the recessed portion 43a which is recessed forward at a periphery of the joint 46R of the regulating tether 45 (i.e. in a vicinity of the center in the up and down direction and in the left and right direction of the thorax arresting surface 43). With this configuration, the thorax arresting surface 43 is able to arrest the thoracic region MB widely with a substantially oval, curved surface 43b in a periphery of the recessed portion 43a, and protect the thoracic region MB of the occupant MP further softly with the thorax arresting surface 43 provided with the recessed portion 43a.

Figure 14:
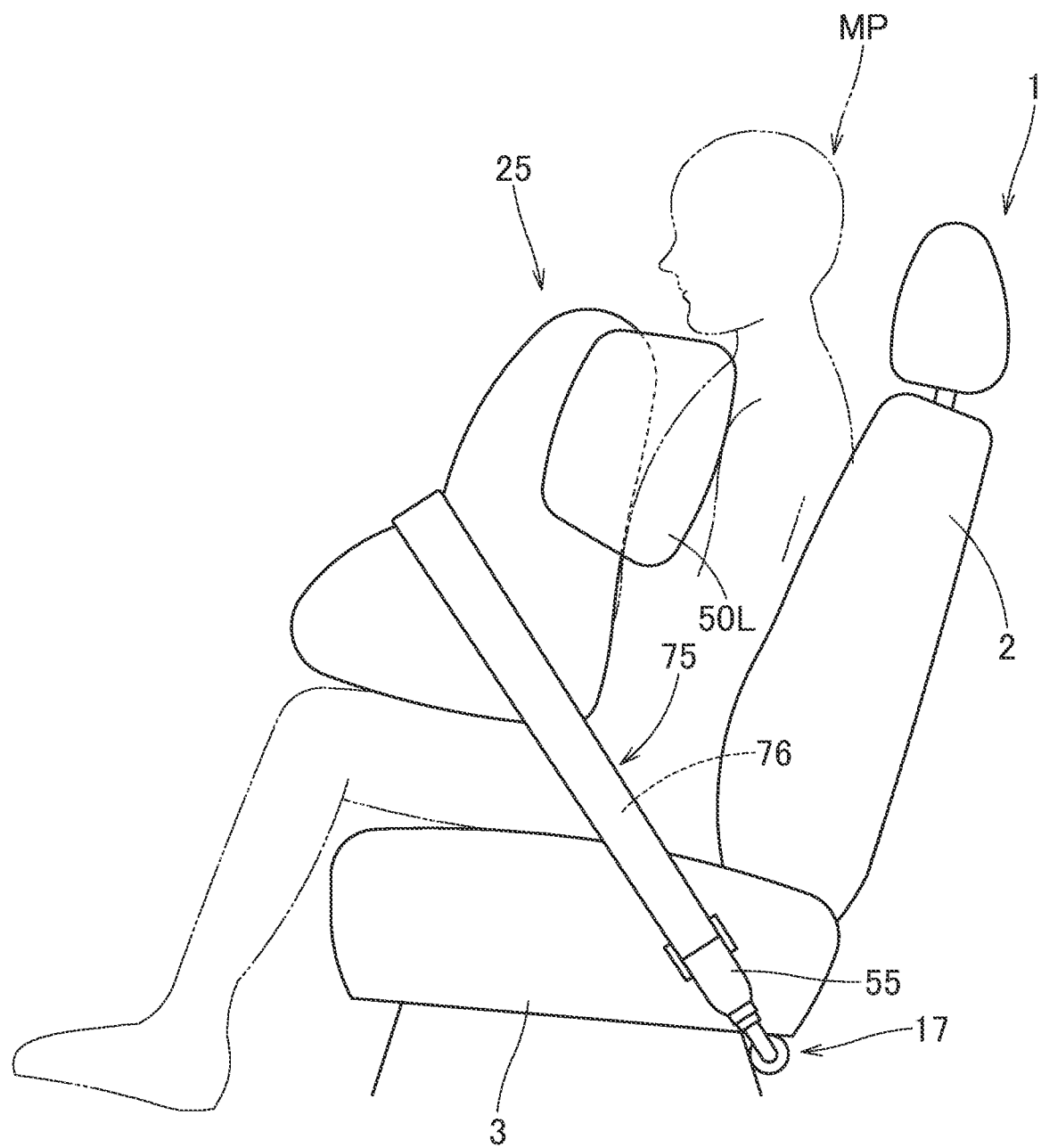
FIG. 14 is a side view of the seat at airbag deployment in the occupant protection device of FIG. 13.

Furthermore, in the occupant protection device S in accordance with the exemplary embodiment, the holding member that holds the airbag 25 is composed of the lap belt 10, of the seatbelt 7, that is adapted to restrain the pelvic region MW when the occupant MP wears the seatbelt 10. This configuration makes it unnecessary to prepare a separate holding member for holding the airbag, and contributes to reduction of number of parts of the device. If such an advantageous effect does not have to be considered, the airbag 25 may be configured to be held by a holding member 75 that is separate from the seatbelt, as can be seen in FIGS. 13 and 14. The holding member 75 includes a main body 76 that is composed of a shape-retentive material and holds the airbag 25, and a cover 77 that covers the main body 76 and the airbag 25 as folded. The holding member 75 is connected to the seat 1 at a vicinity of the left end of the seat portion 3, and is disposed around the pelvic region MW of the occupant MP in a rotatable fashion with respect to the seat 1 when buckled by the right end. The holding member 75 is designed to leave a void space between itself and the pelvic region MW of the occupant MP when worn so that the airbag 25 is inflated to cover the front surface of the upper body MU of the occupant MP while filling the void space between the holding member 75 and the pelvic region MW, as can be seen in FIG. 14.

The airbag may alternatively be configured like an airbag 80 depicted in FIGS. 15 to 19. The airbag 80 is composed of a fabric woven with polyester yarn, polyamide yarn or the like. The airbag 80 includes a bag body 81, two tethers 92L, 92R that serve as an opening-preventing means for regulating the shape of the bag body 81 as inflated, a conduit portion 55 that is connected to the inflator 17, and a mounting portion 58 that attaches the bag body 81 to the lap belt 10. The conduit portion 55 and the mounting portion 58 have the same structures as those of the airbag 25 described Referring to FIGS. 15 and 16, the bag body 81 includes a supporting inflatable portion 83 and a front inflatable portion 87 which extends from a front end 83b of the supporting inflatable portion 83.

Figure 16:
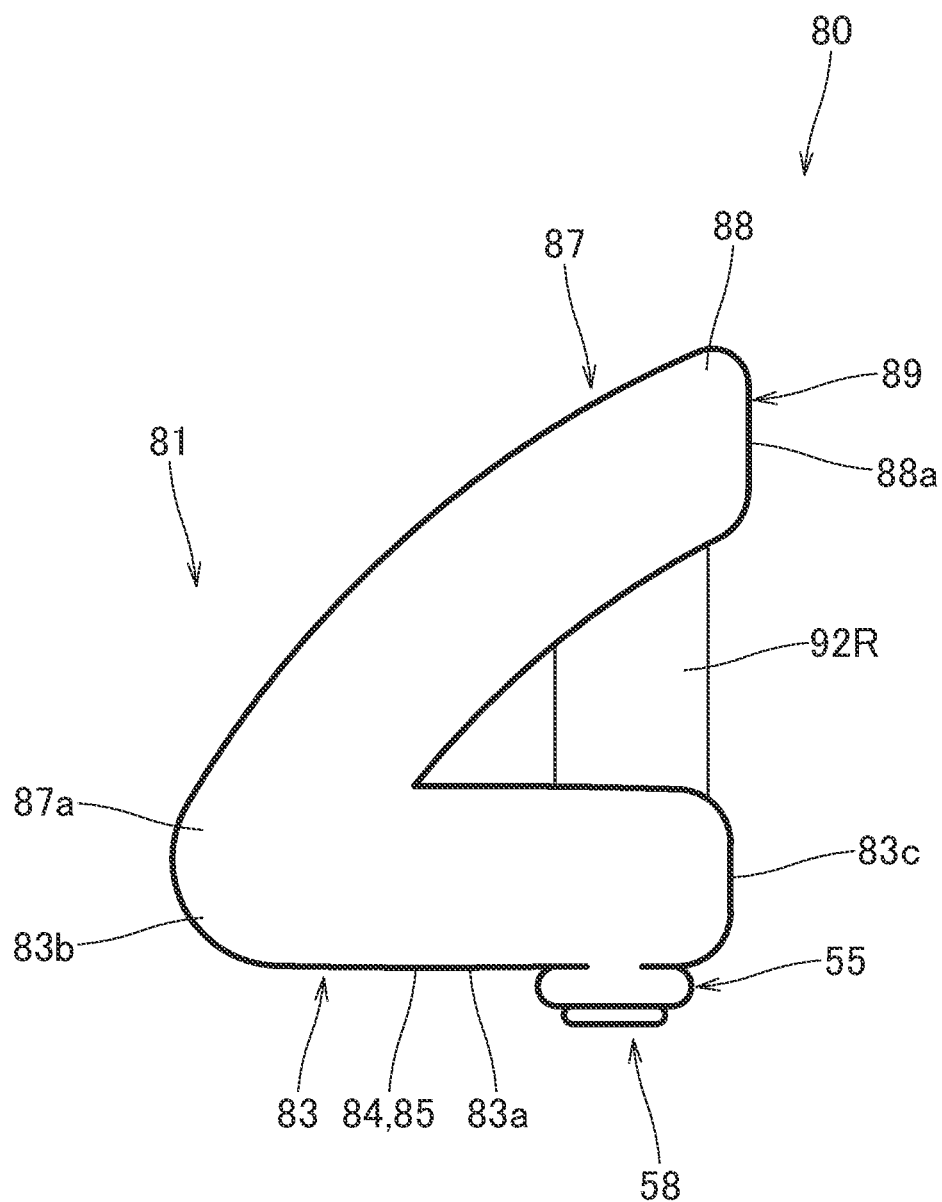
FIG. 16 is a schematic vertical sectional view of the airbag of FIG. 15 taken along a front and rear direction.
Figure 18:
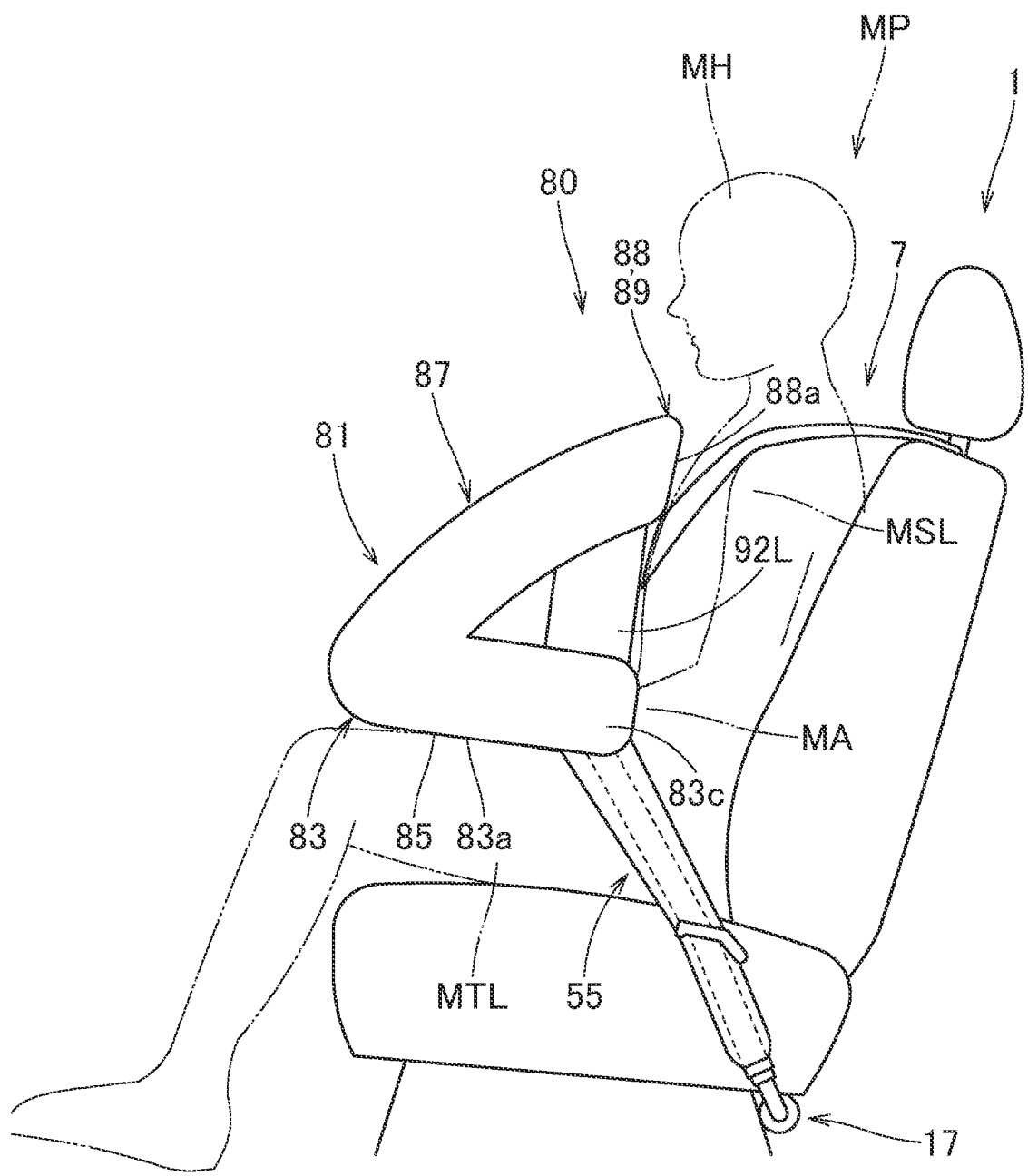
FIG. 18 is a side view of the seat at airbag deployment in the occupant protection device employing the airbag of FIG. 15.

The supporting inflatable portion 83 is designed to be inflated into a substantially board shape extending generally along a front and rear direction over the upper surfaces of left and right thighs MTL, MTR of the occupant MP at airbag deployment. The supporting inflatable portion 83 is designed to be inflated into a substantially rectangular board shape whose rear end 83c is disposed in front of the abdomen MA of the occupant MP sitting in the seat 1, as can be seen in FIG. 18. More specifically, the supporting inflatable portion 83 is designed such that the width in a left and right direction when inflated is greater than that of the thighs MTL and MTR so as to cover substantially an entirety of the upper surfaces of the thighs MTL and MTR, and such that the width in a front and rear direction is such as to cover the upper surfaces of the thighs MTL and MTR to a vicinity of the knees. A lower wall 84 which forms a lower surface 83a of the supporting inflatable portion 83 constitutes a supported surface 85 that is to be supported by the left and right thighs MTL, MTR of the occupant MP when the airbag 80 arrests him. The conduit portion 55 is disposed in a vicinity of the rear end 83c in the lower surface of the supporting inflatable portion 83, as can be seen in FIG. 16. At least one communication hole (reference sign omitted) is disposed proximate to the rear end of the lower wall 84 of the supporting inflatable portion 83 for providing gas communication between the supporting inflatable portion 83 and the conduit portion 55.

Figure 17:
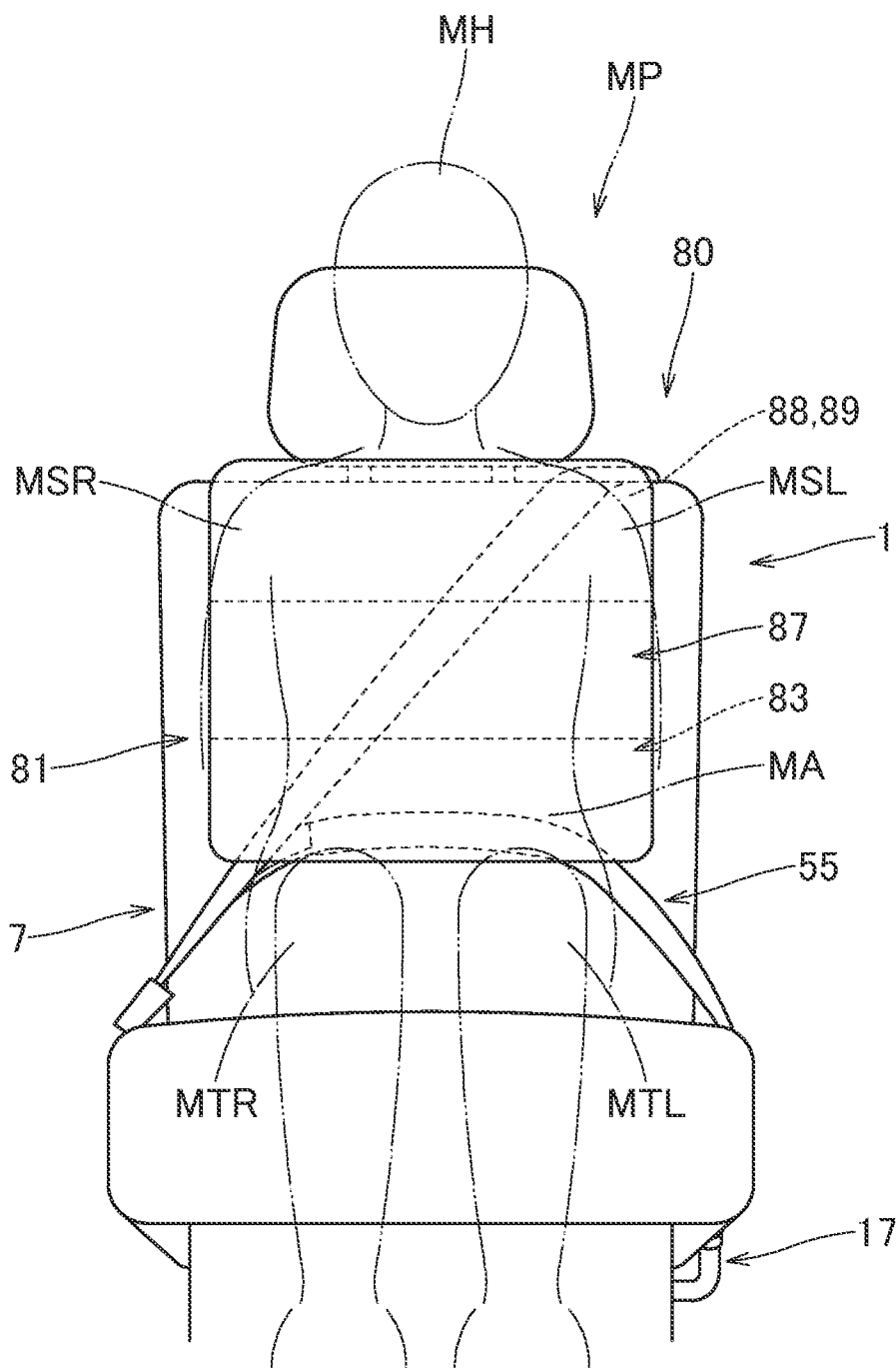
FIG. 17 is a front view of a seat at airbag deployment in an occupant protection device employing the airbag of FIG. 15.

The front inflatable portion 87 is designed to be inflated into a substantially board shape that extends rearwardly and upwardly from a front end 83b portion of the supporting inflatable portion 83, in other words, that is disposed at a rearward and upward slant as viewed from the left or right. The front inflatable portion 87 is formed continuous with the supporting inflatable portion 83, and is designed to be inflated into a substantially rectangular board shape whose width in the left and right direction is substantially the same as that of the supporting inflatable portion 83. The front inflatable portion 87 is designed such that its rear end portion 88 is deployed in front of the left and right shoulders MS (MSL, MSR) of the occupant MP as sitting in the seat 1, and substantially immediately above the rear end 83c of the supporting inflatable portion 83, as can be seen in FIG. 18. In the airbag 80 of this embodiment, the rear end portion 88 of the front inflatable portion 87 constitutes a shoulder restraining portion 89 that is adapted to restrain the left and right shoulders MSL, MSR of the occupant M. That is, in the airbag 80, the shoulder restraining portion 89 is supported by the supporting inflatable portion 83 through the intermediary of a front end 87a portion of the front inflatable portion 87. As can be seen in FIG. 17, the rear end portion 88 (i.e. the shoulder restraining portion 89) is designed to protrude slightly farther outwardly in the left and right direction than the left and right shoulders MSL, MSR of the occupant MP at airbag deployment. Further, the rear end portion 88 which constitutes the shoulder restraining portion 89 is designed such that the rear surface 88a is deployed substantially along the up and down direction so as to cover the shoulders MSL, MSR widely in the up and down direction. The bag body 81 of this embodiment is designed such that the supporting inflatable portion 83 as inflated and the front inflatable portion 87 as inflated have approximately the same thicknesses.

Figure 15:
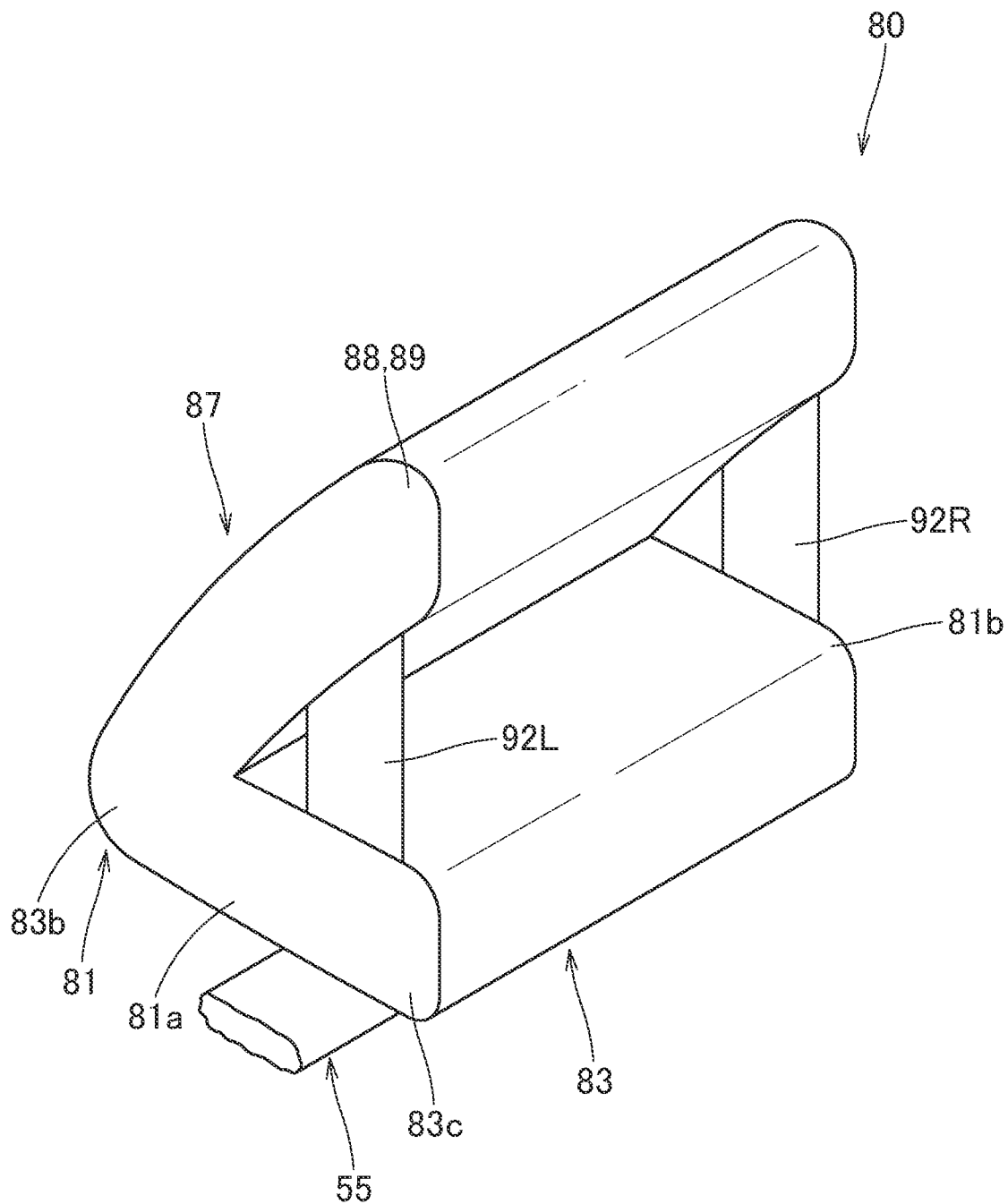
FIG. 15 is a rear perspective view of an airbag in accordance with an alternative embodiment as inflated by itself.

Referring to FIG. 15, the tethers 92L, 92R serving as the opening-preventing means connect the supporting inflatable portion 83 and front inflatable portion 87 at a vicinity of a left end 81a and at a vicinity of a right end 81b of the bag body 81, respectively. Each of the tethers 92L, 92R is formed into a band shape extending substantially along the up and down direction and connecting the supporting inflatable portion 83 and front inflatable portion 87 by a wide area in the front and rear direction including a vicinity of the rear end portion 88 of the front inflatable portion and a vicinity of the rear end 83c of the supporting inflatable portion 83. The tethers 92L, 92R prevent the rear end portion 88 of the front inflatable portion 87 from being separated from the supporting inflatable portion 83 at airbag deployment.

Figure 19:
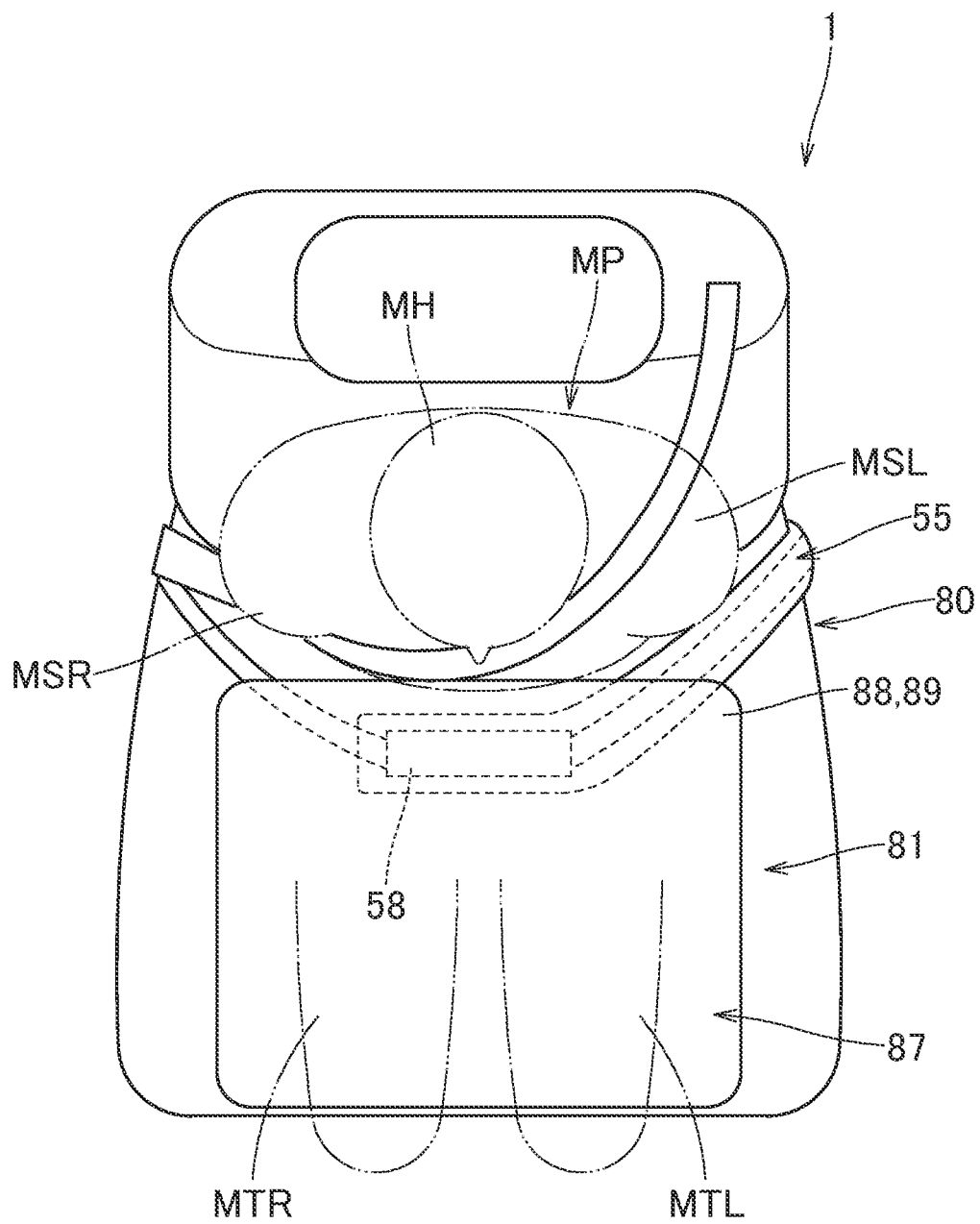
FIG. 19 is a plan view of the seat at airbag deployment in the occupant protection device employing the airbag of FIG. 15.

With the airbag 80 configured as described above, since the shoulder restraining portion 89 constituted by a rear end region (i.e. the rear end portion 88) of the front inflatable portion 87 is arranged substantially along the left and right direction in front of the shoulders MSL, MSR of the occupant MP sitting in the seat 1 as can be seen in FIGS. 17 and 19, the shoulder restraining portion 89 is able to restrain the left and right shoulders MSL, MSR steadily even if the airbag 80 is deployed in a manner slightly displaced in the left and right direction with respect to the occupant MR.

Figure 20:
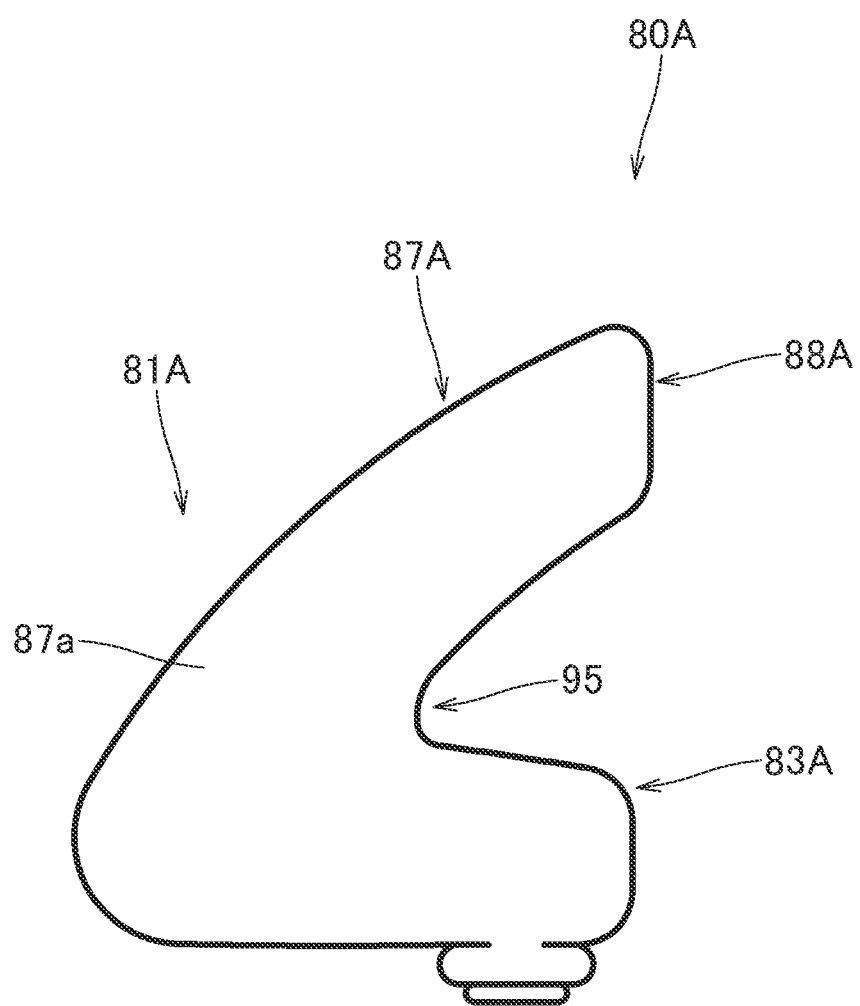
FIG. 20 is a schematic vertical sectional view of a modification of the airbag.

The airbag 80 configured as described above includes the tethers 92L, 92R acting as the opening-preventing means that prevents the rear end portion 88 of the front inflatable portion 87 from being separated from the supporting inflatable portion 83 at airbag deployment. The tethers 92L, 92R steady the position of the front inflatable portion 87 with respect to the supporting inflatable portion 89. In other words, the tethers 92L, 92R prevent the shoulder restraining portion 89 from being displaced upward, thus steady the position of the shoulder restraining portion 89 with respect to the occupant MR. The opening-preventing means of the airbag 80 is composed of the tethers 92L, 92R provided separately from the bag body 81 and disposed in a vicinity of the left edge 81a and in a vicinity of the right edge 81b of the bag body 81, respectively. An airbag 80A depicted in FIG. 20 includes an opening-preventing means of an alternative structure. In the airbag 80A, a front inflatable portion 87A and a supporting inflatable portion 83A are connected at a front end 87a portion of the front inflatable portion 87A which is formed thicker than remaining portion. This thick-inflated portion 95 constitutes the opening-preventing means that regulates the position of the front inflatable portion 87A (i.e. prevents a rear end portion of the front inflatable portion 87A from being separated from the supporting inflatable portion 83A). The tethers 92L, 92R separate from the bag body 81 are excellent in easiness in production and adequateness in preventing separation of the rear end portion of the front inflatable portion from the supporting inflatable portion.

The airbag may further alternatively be configured like an airbag 100 depicted in FIGS. 21 to 26. The airbag 100 is composed of a flexible fabric woven with polyester yarn, polyamide yarn or the like. The airbag 100 includes a bag body 101, a tether 111 that regulates the shape of the bag body 101 as inflated, a conduit portion 55 that is connected to the inflator 17, and a mounting portion 58 that attaches the bag body 101 to the lap belt 10. The conduit portion 55 and the mounting portion 58 have the same structures as those of the airbag 25 described above, respectively, and therefore, they will not be described in detail and are assigned common reference numerals.

Figure 21:
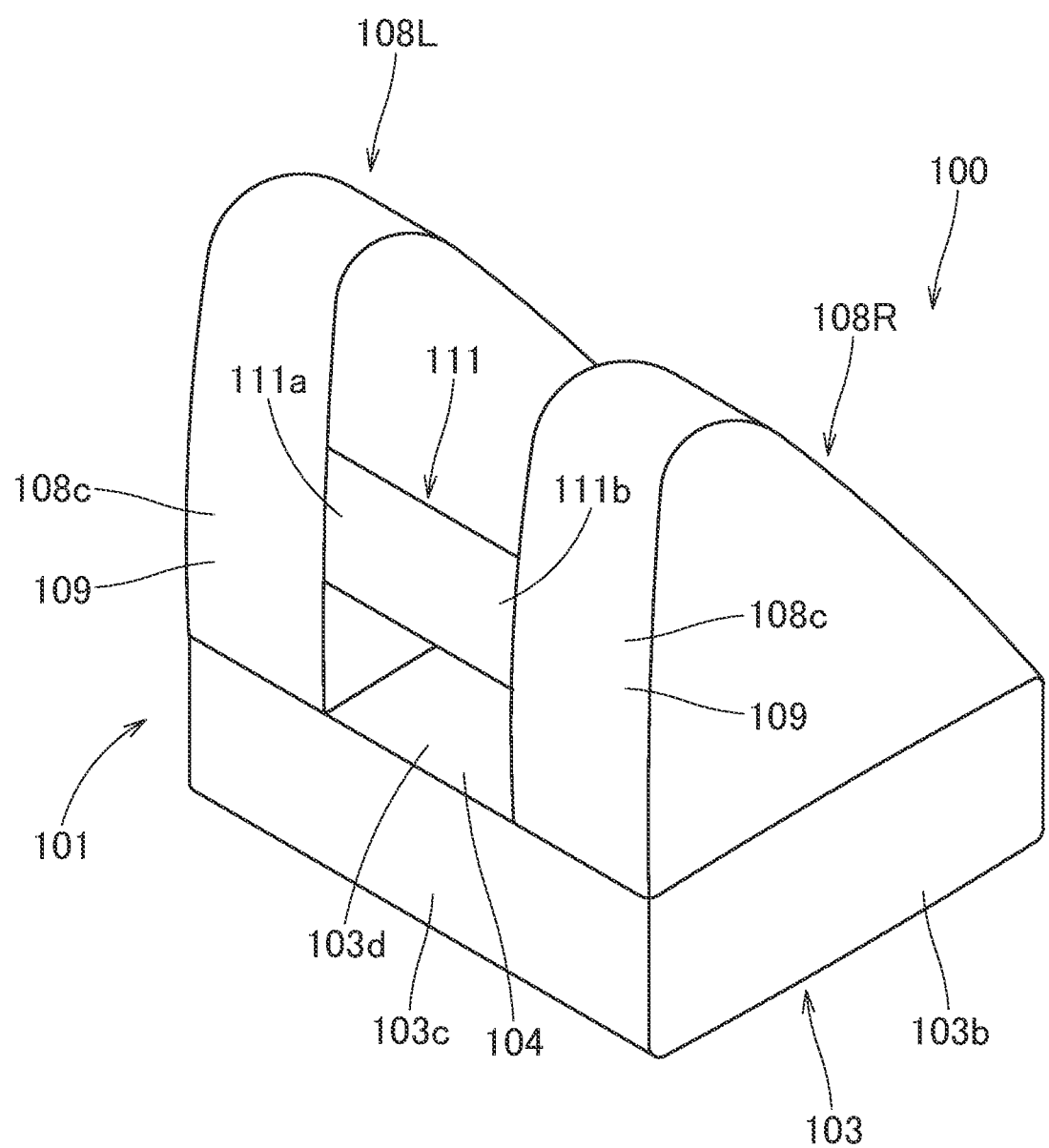
FIG. 21 is a rear perspective view of an airbag in accordance with another alternative embodiment as inflated by itself.
Figure 22:
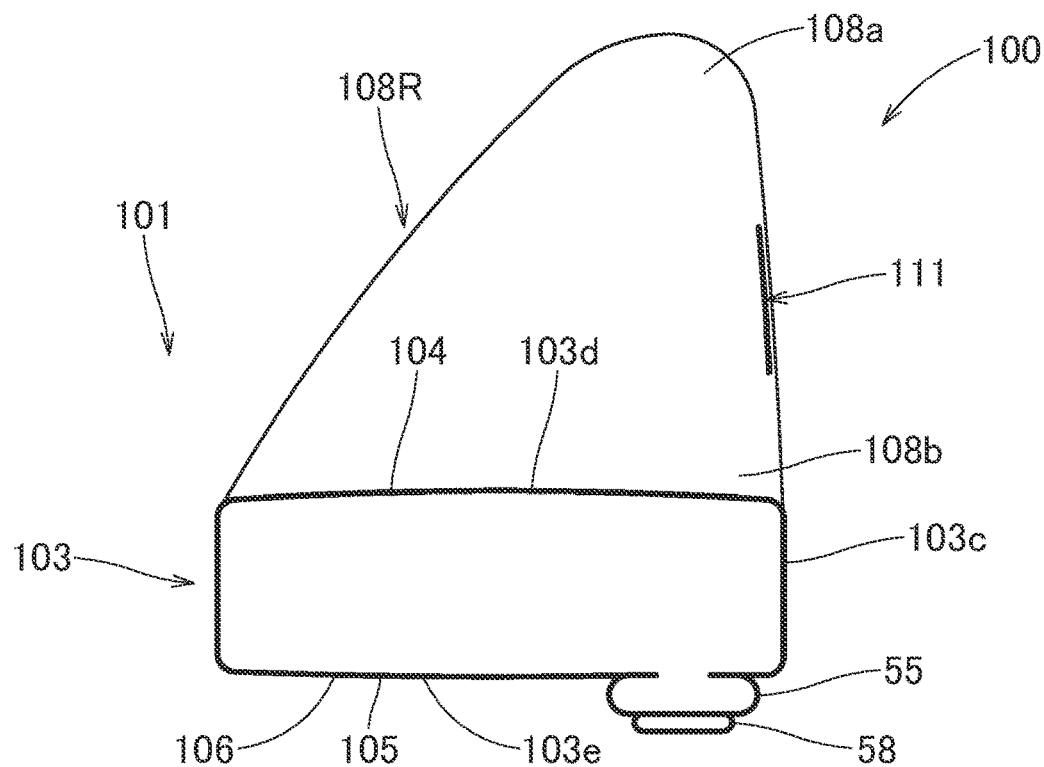
FIG. 22 is a schematic vertical sectional view of the airbag of FIG. 21 taken along a front and rear direction.
Figure 23:
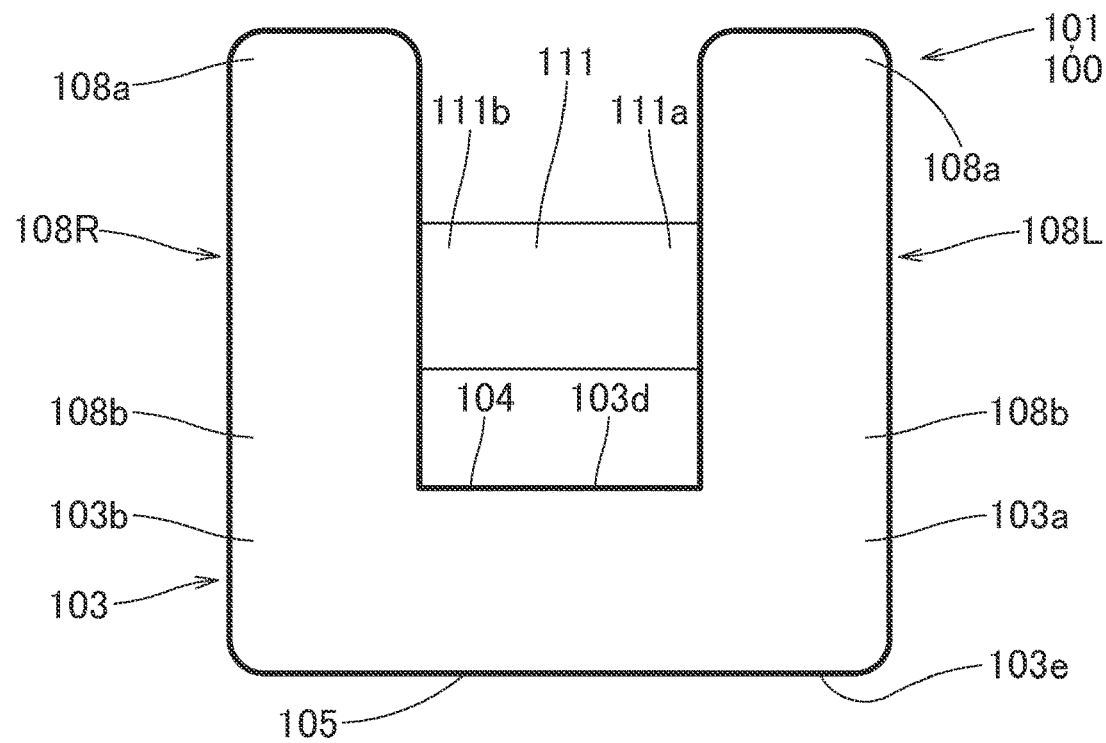
FIG. 23 is a schematic vertical sectional view of the airbag of FIG. 21 taken along a left and right direction.

Referring to FIGS. 21 to 23, the bag body 101 includes a supporting inflatable portion 103 and two shoulder restraining portions 108L, 108R that extend upward each from a vicinity of a left end 103a and a vicinity of a right end 103b of the supporting inflatable portion 103, respectively.

Figure 25:
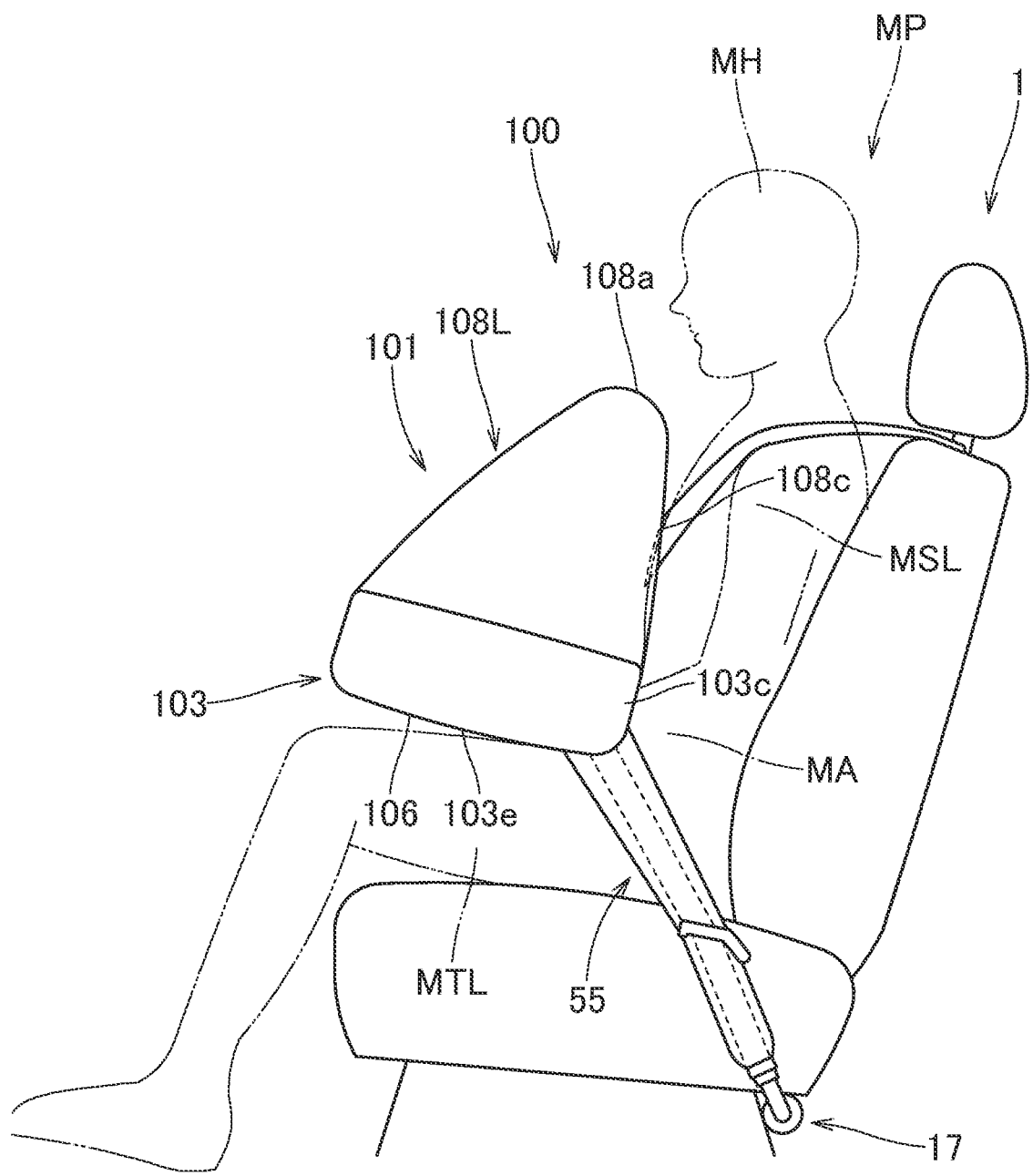
FIG. 25 is a side view of the seat at airbag deployment in the occupant protection device employing the airbag of FIG. 21.

Similarly to the supporting inflatable portion 83 of the airbag 80 described above, the supporting inflatable portion 103 is designed to be inflated into a substantially board shape extending generally along a front and rear direction over the upper surfaces of left and right thighs MTL, MTR of the occupant MP at airbag deployment. The supporting inflatable portion 103 is designed to be inflated into a substantially rectangular board shape whose rear end 103c is disposed in front of the abdomen MA of the occupant MP sitting in the seat 1, as can be seen in FIG. 25. More specifically, the supporting inflatable portion 103 is designed such that the width in the left and right direction when inflated is greater than that of the thighs MTL and MTR so as to cover substantially an entirety of the upper surfaces of the thighs MTL and MTR, and such that the width in the front and rear direction is such as to cover the upper surfaces of the thighs MTL and MTR to a vicinity of the knees. A lower wall 105 which forms a lower surface 103e of the supporting inflatable portion 103 constitutes a supported surface 106 that is to be supported by the left and right thighs MTL, MTR of the occupant MP when the airbag 100 arrests him. The conduit portion 55 is disposed in a vicinity of the rear end 103c in the lower surface of the supporting inflatable portion 103, as can be seen in FIG. 22. At least one communication hole (reference sign omitted) is disposed proximate to the rear end of the lower wall 105 of the supporting inflatable portion 103 for providing gas communication between the supporting inflatable portion 103 and the conduit portion 55.

As can be seen in FIGS. 21 and 23, each of the shoulder restraining portions 108L, 108R is formed to extend substantially along an up and down direction, extend upward from an upper surface 103d of the supporting inflatable portion 103 at a vicinity of the left end 103a/the right end 103b of the supporting inflatable portion 103. Each of the shoulder restraining portions 108L, 108R is in gas communication with the supporting inflatable portion 103 at a vicinity of the lower end 108b. Each of the shoulder restraining portions 108L, 108R is designed to be inflated into such a board shape that extends substantially along the front and rear direction and is substantially triangular as viewed from the left or right. More particularly, each of the shoulder restraining portions 108L, 108R as inflated has, as viewed from the left or right, a substantially right triangular shape whose width in the front and rear direction in the lower end 108b portion is substantially identical to the width in the front and rear direction of the supporting inflatable portion 103 and whose rear wall 109 forming a rear surface 108c of the shoulder restraining portion as deployed is substantially orthogonal to the upper surface 103d (or upper wall 104) of the supporting inflatable portion 103. Each of the shoulder restraining portions 108L, 108R is configured to restrain the shoulder MSL/MSR of the occupant MP by the rear surface 108c (or rear wall 109). Moreover, as can be seen in FIG. 25, the width in the up and down direction of each of the shoulder restraining portions 108L, 108R is set such that the upper end 108a is positioned farther downward than the head MH and farther upward than the shoulder MSL/MSR of the occupant MP at airbag deployment. The bag body 101 is designed such that the supporting inflatable portion 103 and shoulder restraining portions 108L, 108R as inflated have approximately the same thicknesses.

The tether 111 of this embodiment connects rear end portions (vicinities of the rear surfaces 108c) of the shoulder restraining portions 108L, 108R for regulating a clearance between the shoulder restraining portions 108L, 108R at airbag deployment, as can be seen in FIGS. 21 and 22. More specifically, the tether 111 is disposed substantially along the left and right direction at an intermediate position in the up and down direction of the shoulder restraining portions 108L, 108R, and jointed to the rear end portions of the shoulder restraining portions 108L, 108R (specifically, at positions proximate to the rear walls 109) by opposite ends 111a, 111b. In this specific embodiment, the width of the tether 111 is set to approximately one third of the width in the up and down direction of the shoulder restraining portions 108L, 108R.

Figure 24:
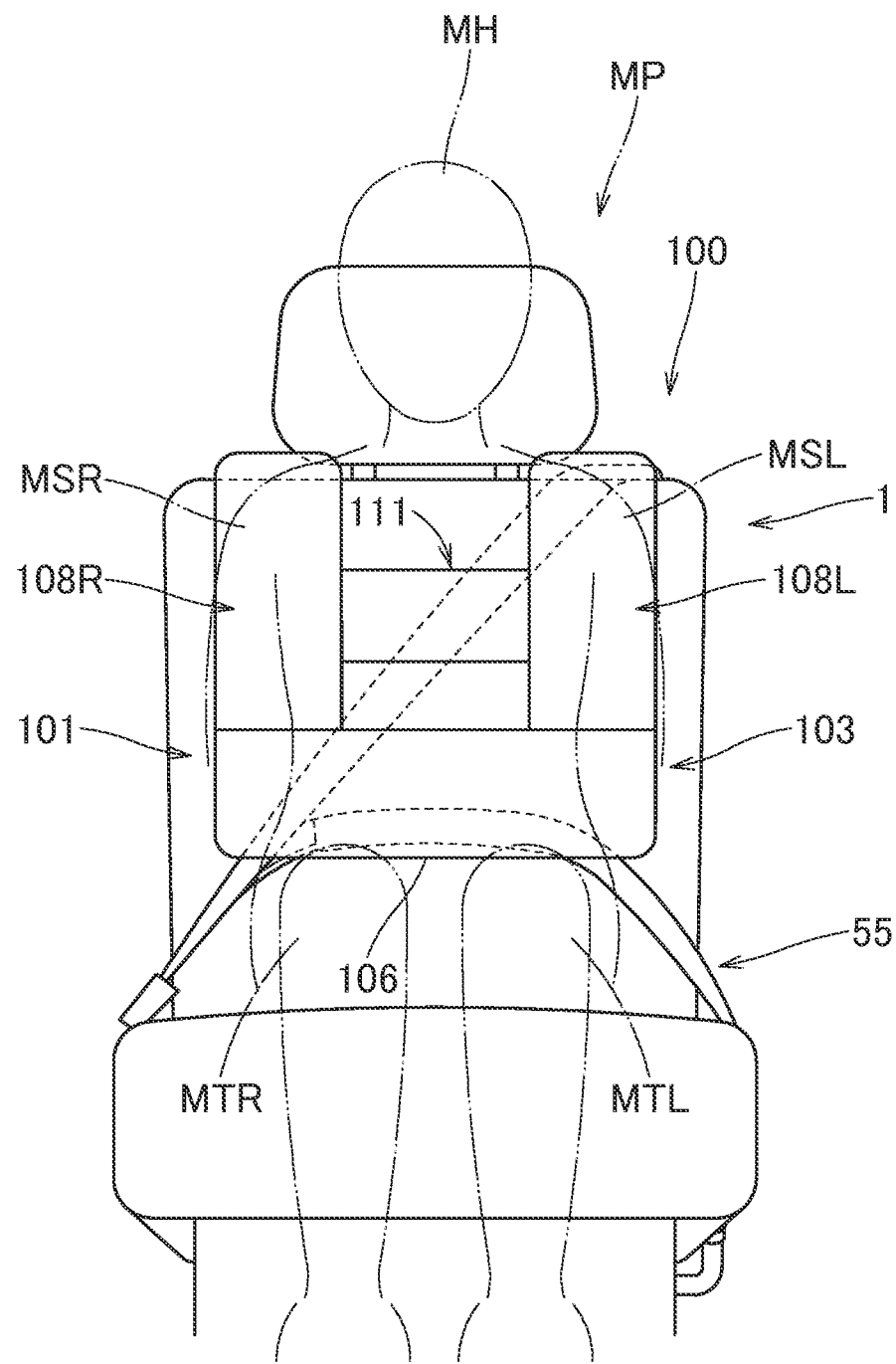
FIG. 24 is a front view of a seat at airbag deployment in an occupant protection device employing the airbag of FIG. 21.
Figure 26:
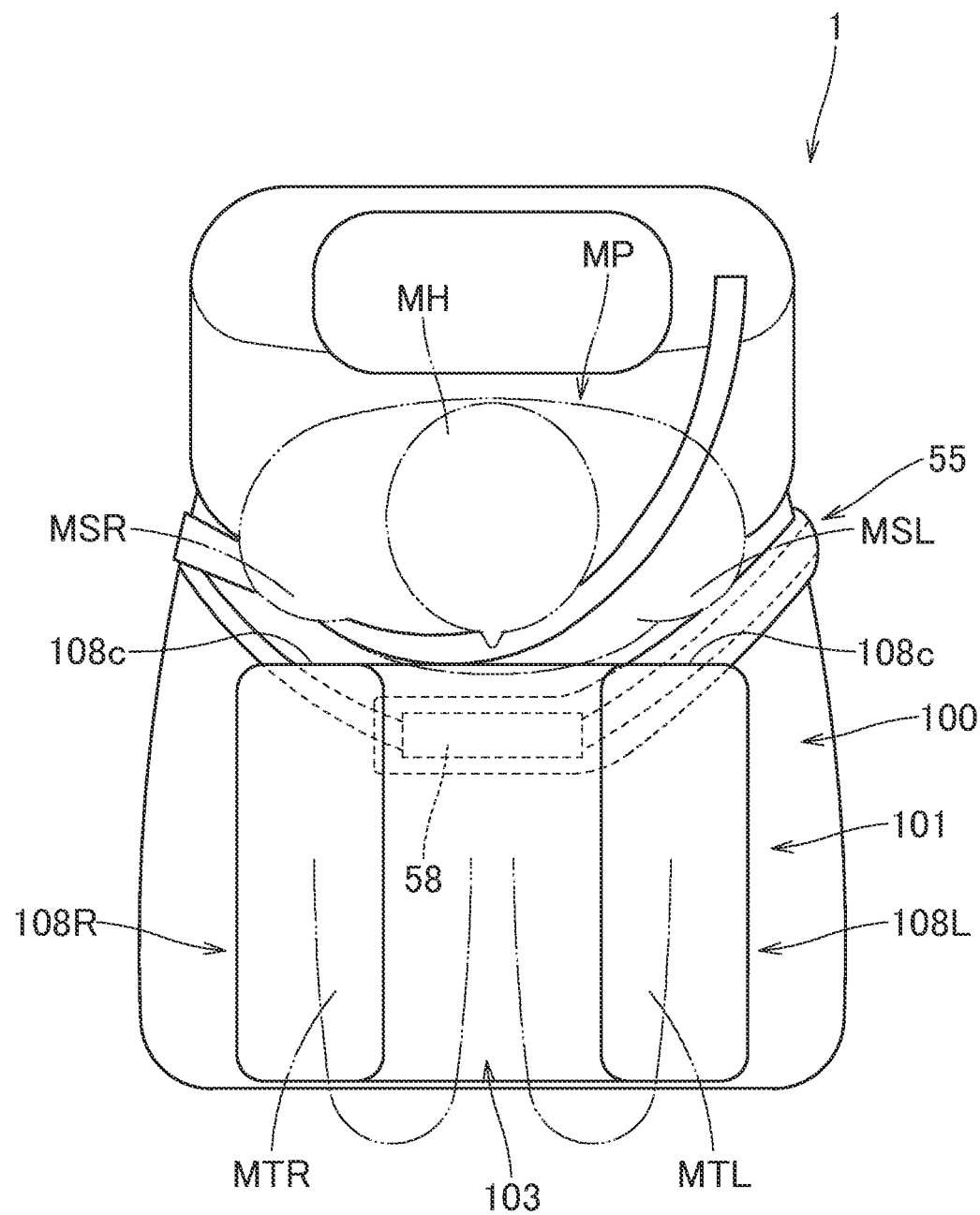
FIG. 26 is a plan view of the seat at airbag deployment in the occupant protection device employing the airbag of FIG. 21.

As can be seen in FIGS. 24 to 26, the airbag 100 configured as described above will be able to protect occupants MP of various builds (occupants of various positions in the up and down direction of the shoulders MSL, MSR with respect to the seat 1) in a steady fashion since the shoulder restraining portions 108L, 108R are deployed substantially along the up and down direction in front of the occupant MP at airbag deployment.

Moreover, the tether 111 connects the shoulder restraining portions 108L, 108R together and prevents the shoulder restraining portions 108L, 108R from being separated from one another when the shoulder restraining portions 108L, 108R arrest the shoulders MSL, MSR of the occupant MR. Therefore, the shoulder restraining portions 108L, 108R are able to restrain the shoulders MSL, MSR of the occupant MP adequately.

Figure 27:
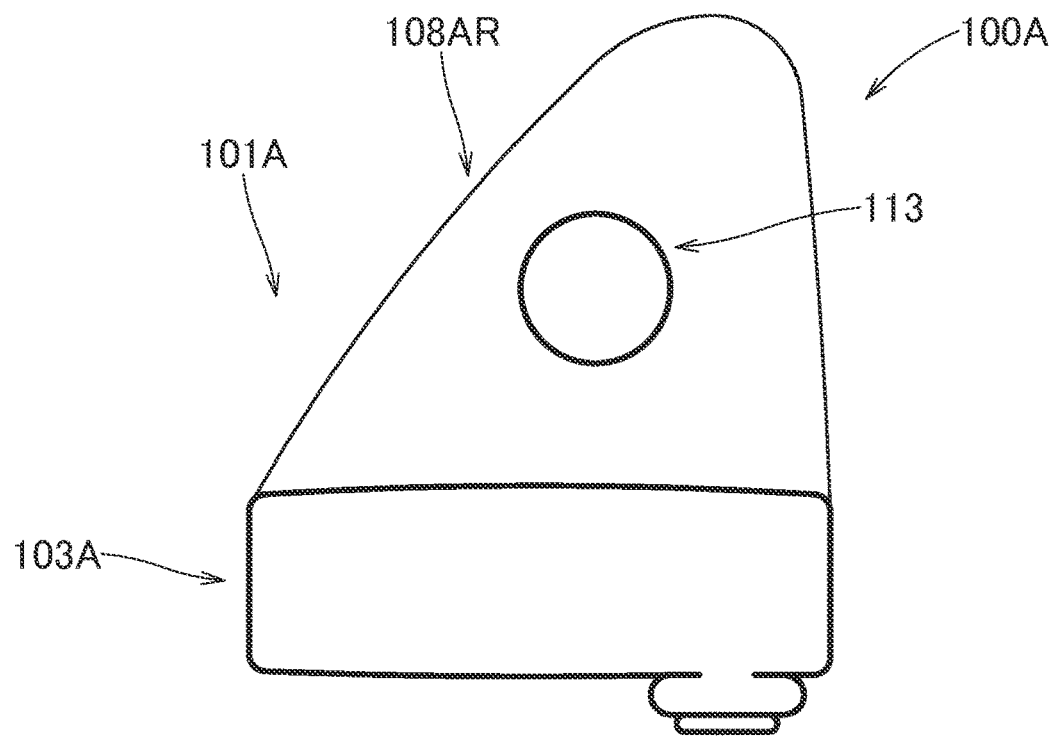
FIG. 27 is a schematic vertical sectional view of yet another modification of the airbag as inflated by itself, taken along a front and rear direction.
Figure 28:
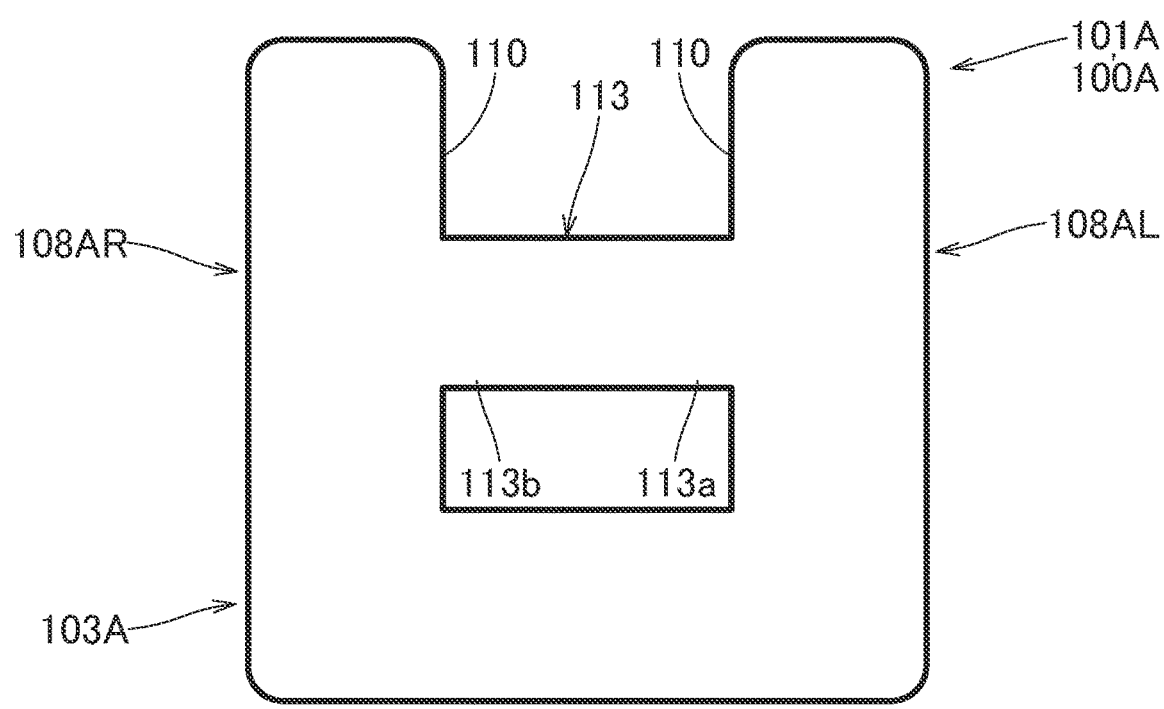
FIG. 28 is a schematic vertical sectional view of the airbag of FIG. 27 taken along a left and right direction.

The airbag may further alternatively be configured like an airbag 100A depicted in FIGS. 27 and 28. The airbag 100A includes, instead of a tether, a communicating inflatable portion 113 that regulates a clearance between shoulder restraining portions 108AL, 108AR by bringing the shoulder restraining portions 108AL, 108AR into communication with one another. The airbag 100A has the same structure as the airbag 100 described above except in including the communicating inflatable portion 113 instead of the tether. Therefore, common members will be assigned "A" at the end of common reference numerals, and will not be described in detail.

The communicating inflatable portion 113 of this embodiment is designed to be inflated into a substantially circular cylinder that extends substantially along a left and right direction at a central position in a front and rear direction of the shoulder restraining portions 108AL, 108AR and at a slightly upper position than the center in an up and down direction of the shoulder restraining portions 108AL, 108AR. The communicating inflatable portion 113 is joined to inner walls 110 of the shoulder restraining portions 108AL, 108AR, which are disposed to face inward in the left and right direction, by opposite ends 113a, 113b, thus brings the shoulder restraining portions 108AL, 108AR into gas communication with one another. In this embodiment, an outer diameter of the communicating inflatable portion 113 is set at approximately two thirds of the thickness of each of the shoulder restraining portions 108AL, 108AR.

In the airbag 100A configured as described above, the communicating inflatable portion 113 tries to maintain its cylindrical outer shape having a predetermined length and exerts a high rigidity compared to the tether 111 used in the airbag 100 described above. Therefore, the communicating inflatable portion 113 helps improve shape retention of the airbag 100A as inflated, prevents the shoulder restraining portions 108AL, 108AR from being deformed considerably (in other words, from being separated from one another or approximating to one another) at arresting the shoulders, so that the shoulder restraining portions 108AL, 108AR will be able to restrain the shoulders of the occupant adequately.

The airbag may further alternatively be configured like an airbag 120 depicted in FIGS. 29 to 35. The airbag 120 is composed of a flexible fabric woven with polyester yarn, polyamide yarn or the like. The airbag 120 includes a bag body 121, a conduit portion 55 that is connected to the inflator 17, and a mounting portion 58 that attaches the bag body 121 to the lap belt 10. The conduit portion 55 and the mounting portion 58 have the same structures as those of the airbag 25 described above, respectively, and therefore, they will be assigned common reference numerals, and will not be described in detail.

Figure 29:
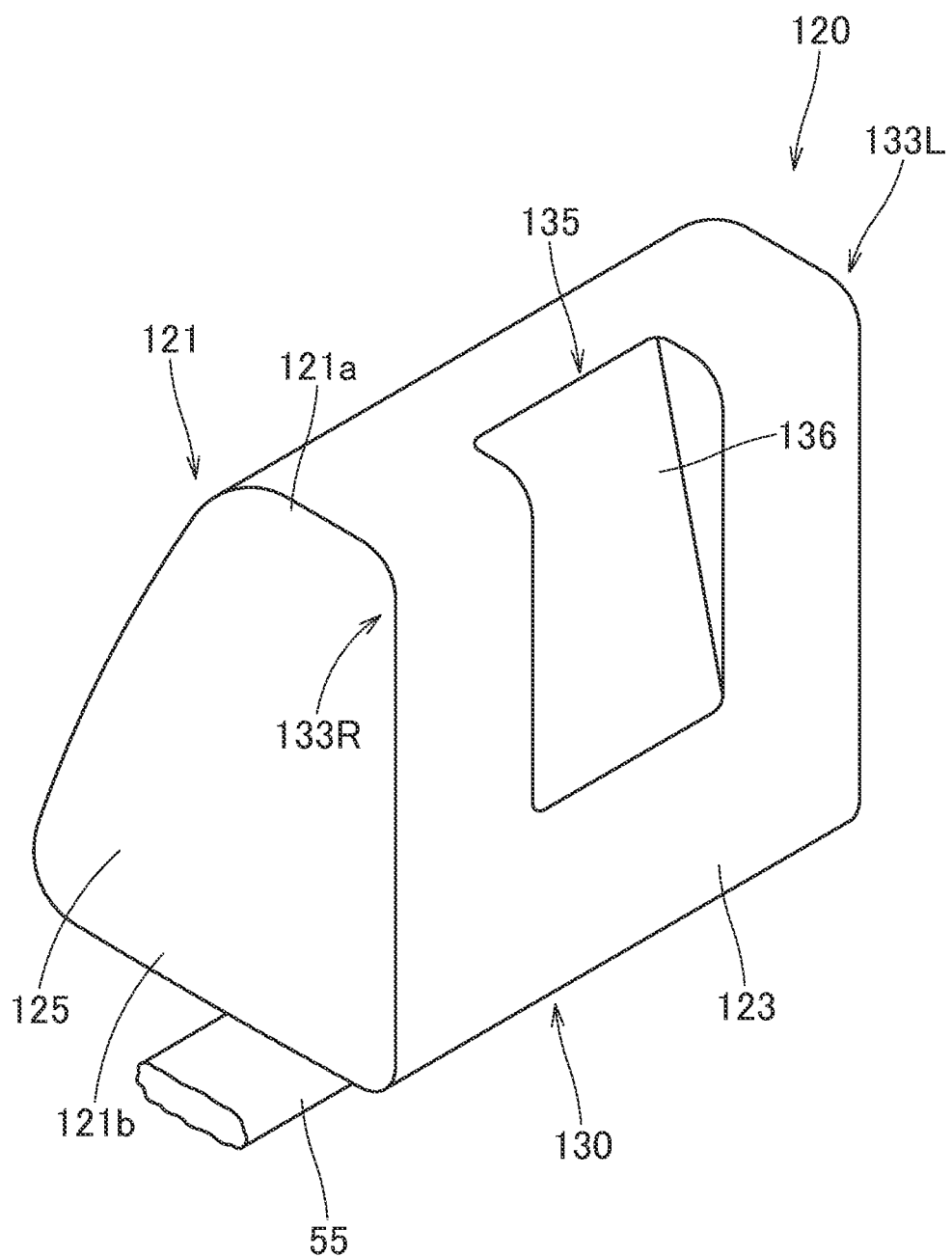
FIG. 29 is a rear perspective view of an airbag in accordance with yet another alternative embodiment as inflated by itself.
Figure 30:
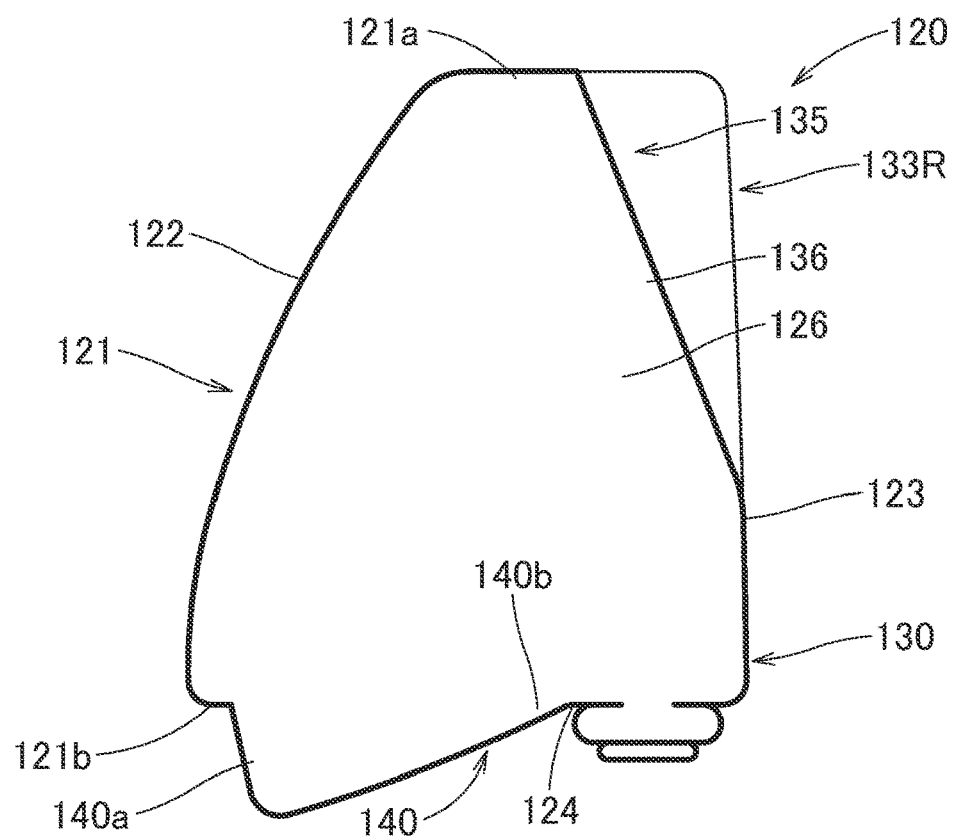
FIG. 30 is a schematic vertical sectional view of the airbag of FIG. 29 taken along a front and rear direction.
Figure 31:
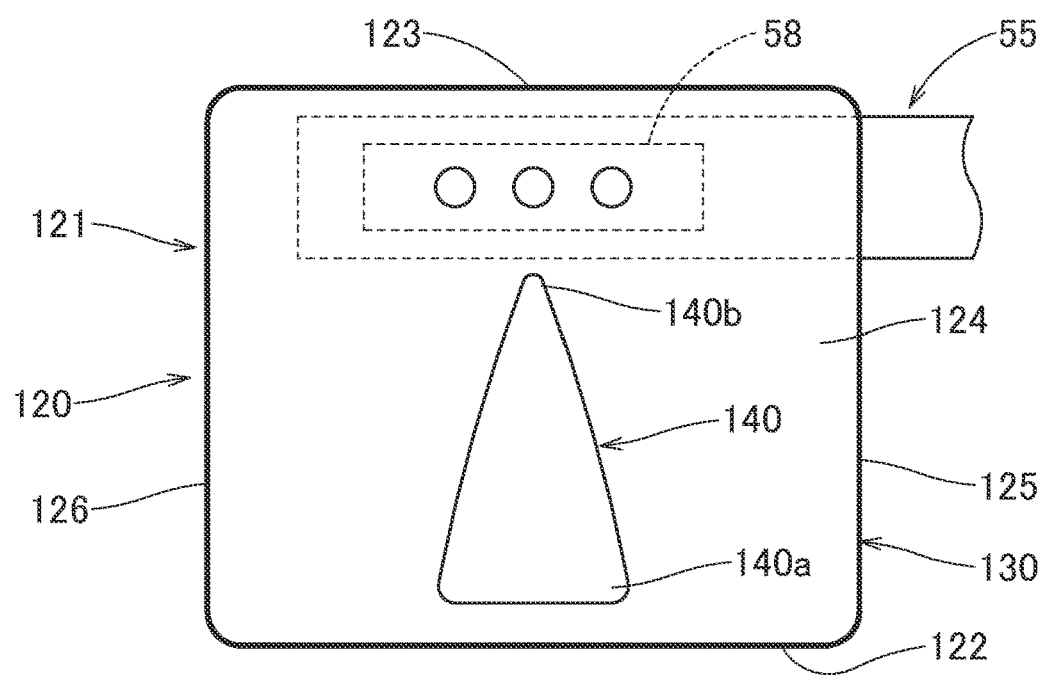
FIG. 31 is a schematic horizontal sectional view of the airbag of FIG. 29 taken along the front and rear direction.
Figure 32:
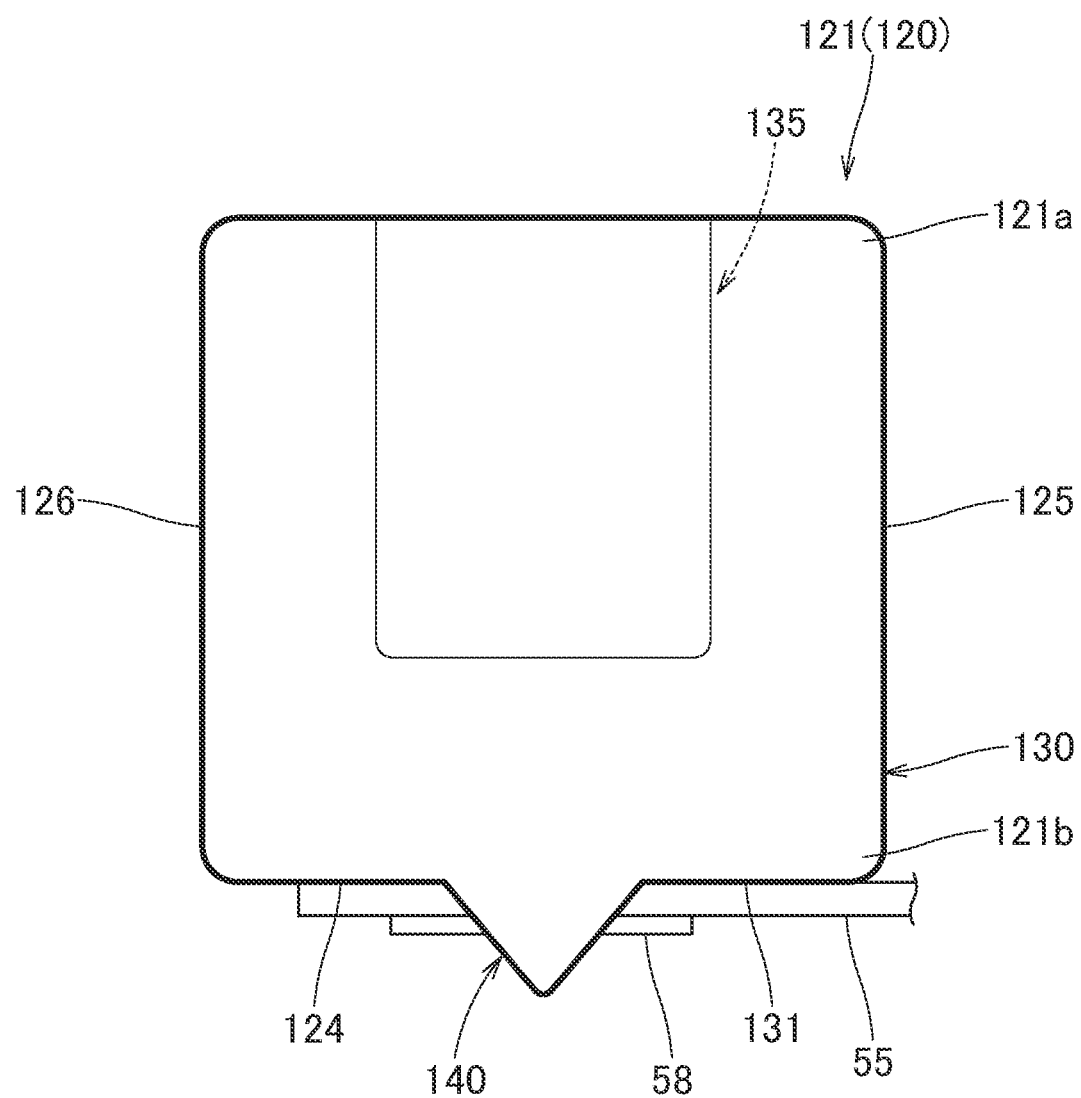
FIG. 32 is a schematic vertical sectional view of the airbag of FIG. 29 taken along a left and right direction.
Figure 34:
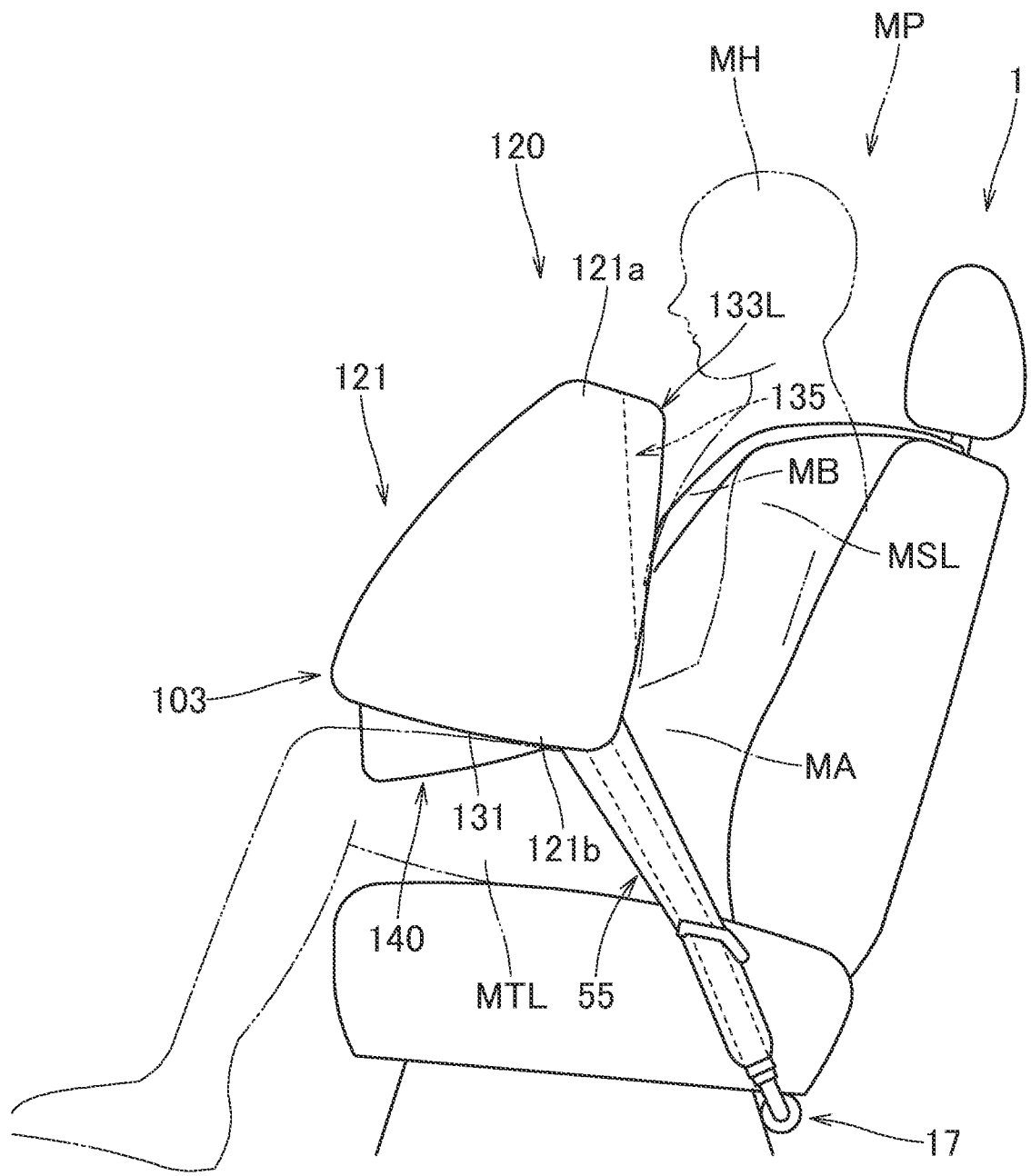
FIG. 34 is a side view of the seat at airbag deployment in the occupant protection device employing the airbag of FIG. 29.

As can be seen in FIGS. 29 and 30, the bag body 121 is designed to be inflated into such a substantially triangular prism whose axis extends substantially along a left and right direction. The bag body 121 as fully inflated has a substantially rectangular shape slightly elongated in the left and right direction when viewed from the front or back. A lower end 121b portion of the bag body 121 as deployed constitutes a supporting inflatable portion 130 that is deployed over the thighs MTL, MTR of the occupant MP. A left end portion and a right end portion of an upper end 121a portion of the bag body 121 as deployed constitute shoulder restraining portions 133L, 133R for restraining left and right shoulders MSL, MSR of the occupant MP. More specifically, the bag body 121 includes a front wall 122 which is configured to be deployed in the front side facing away from the occupant MP, a rear upper wall 123 and a rear lower wall 124 which are configured to be deployed towards the occupant MP, and a left wall 125 and a right wall 126 which are configured to be opposed to one another in the left and right direction at airbag deployment. The rear upper wall 123 and rear lower wall 124 are configured to be substantially orthogonal at airbag deployment. The rear lower wall 124 is designed to extend substantially along the front and rear direction, substantially along the thighs MTL, MTR of the occupant MP at airbag deployment, as can be seen in FIG. 34. The rear lower wall 124 constitutes a lower surface of the supporting inflatable portion 130. In other words, the rear lower wall 124 constitutes a supported surface 131 that is to be supported by the left and right thighs MTL, MTR of the occupant MP when the airbag 120 arrests him. As can be seen in FIGS. 30 and 31, the conduit portion 55 is disposed on an underside of a rear end portion of the rear lower wall 124. At least one communication hole (reference sign omitted) is disposed in a vicinity of the rear end of the rear lower wall 124 and brings the bag body 121 into gas communication with the conduit portion 55.

Figure 35:
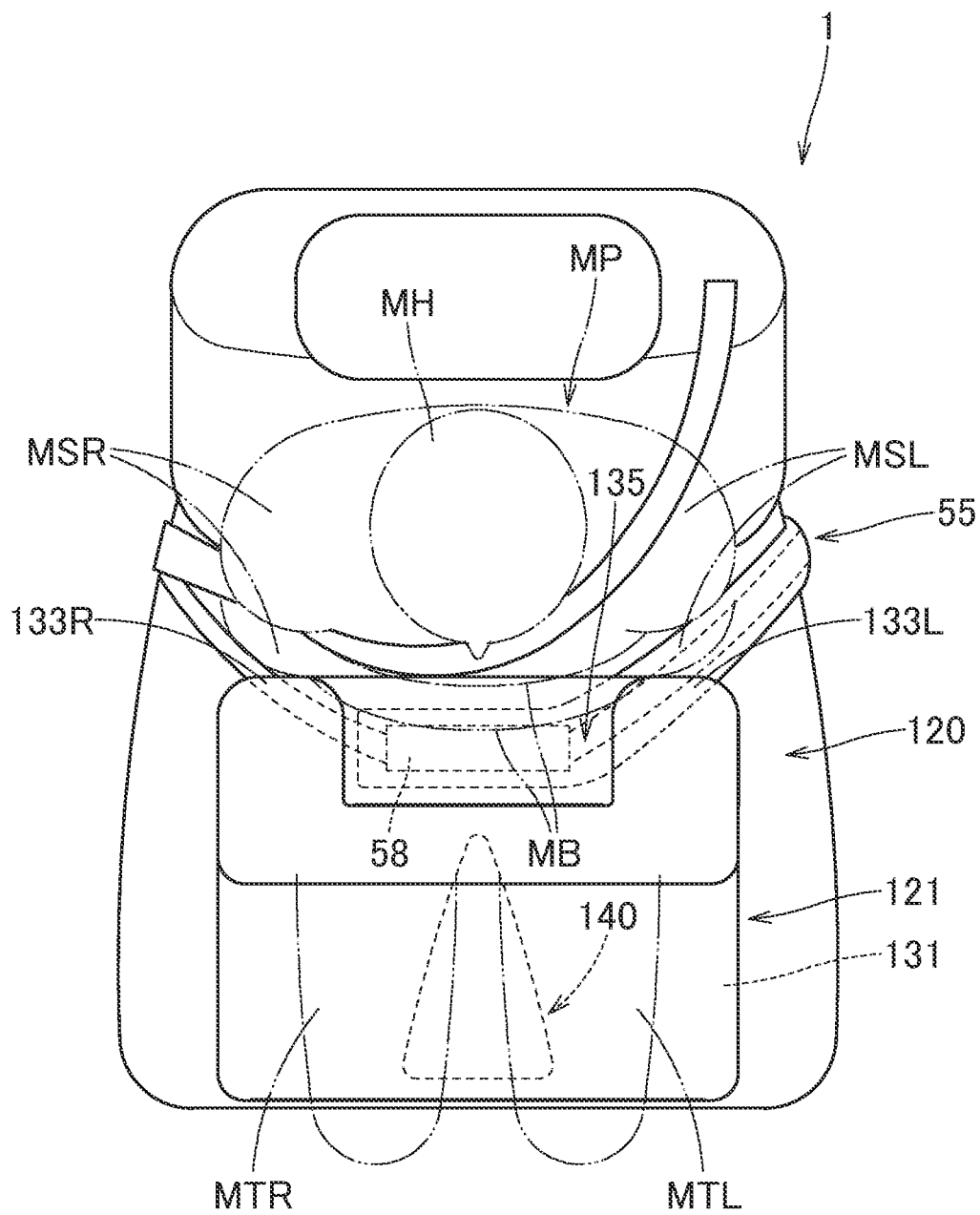
FIG. 35 is a plan view of the seat at airbag deployment in the occupant protection device employing the airbag of FIG. 29.

As can be seen in FIGS. 29 and 30, the bag body 121 of this embodiment includes, at a central position in the left and right direction of the upper end 121a portion between the shoulder restraining portions 133L, 133R, a recessed portion 135 that is recessed forward relative to the surrounding rear surface of the upper end 121a portion. The recessed portion 135 of this specific embodiment extends from the upper end 121a of the bag body 121 to a region slightly farther downward than the center in the up and down direction of the bag body 121. The recessed portion 135 is formed to have a greatest recessed amount at the upper end region and become less recessed toward the lower end. That is, a central portion 136 that forms the bottom of the recessed portion 135 is slanted with respect to the rear upper wall 123 so that the upper side is positioned farther forward than the lower side, as can be seen in FIG. 30. Accordingly, the portions protruding rearward relative to the recessed portion 135 on the left and right sides of the recessed portion 135 constitute the shoulder restraining portions 133L, 133R of the bag body 121 of this embodiment. That is, the shoulder restraining portions 133L, 133R are configured to be deployed substantially along the up and down direction. The airbag 120 is configured to restrain the left and right shoulders MSL, MSR of the occupant MP with the upper end 121a portion of the bag body 121 (i.e. with upper end regions of the shoulder restraining portions 133L, 133R). Accordingly, when the shoulder restraining portions 133L, 133R restrain the shoulders MSL, MSR of the occupant MP, the thoracic region MB is positioned in the recessed portion 135, as shown in FIG. 35. Since the recessed portion 135 is recessed forward relative to the shoulder restraining portions 133L, 133R, when the shoulders MSL, MSR are restrained by the shoulder arresting portions 133L, 133R, the thoracic region MB is prevented from contacting the bag body 121.

Figure 33:
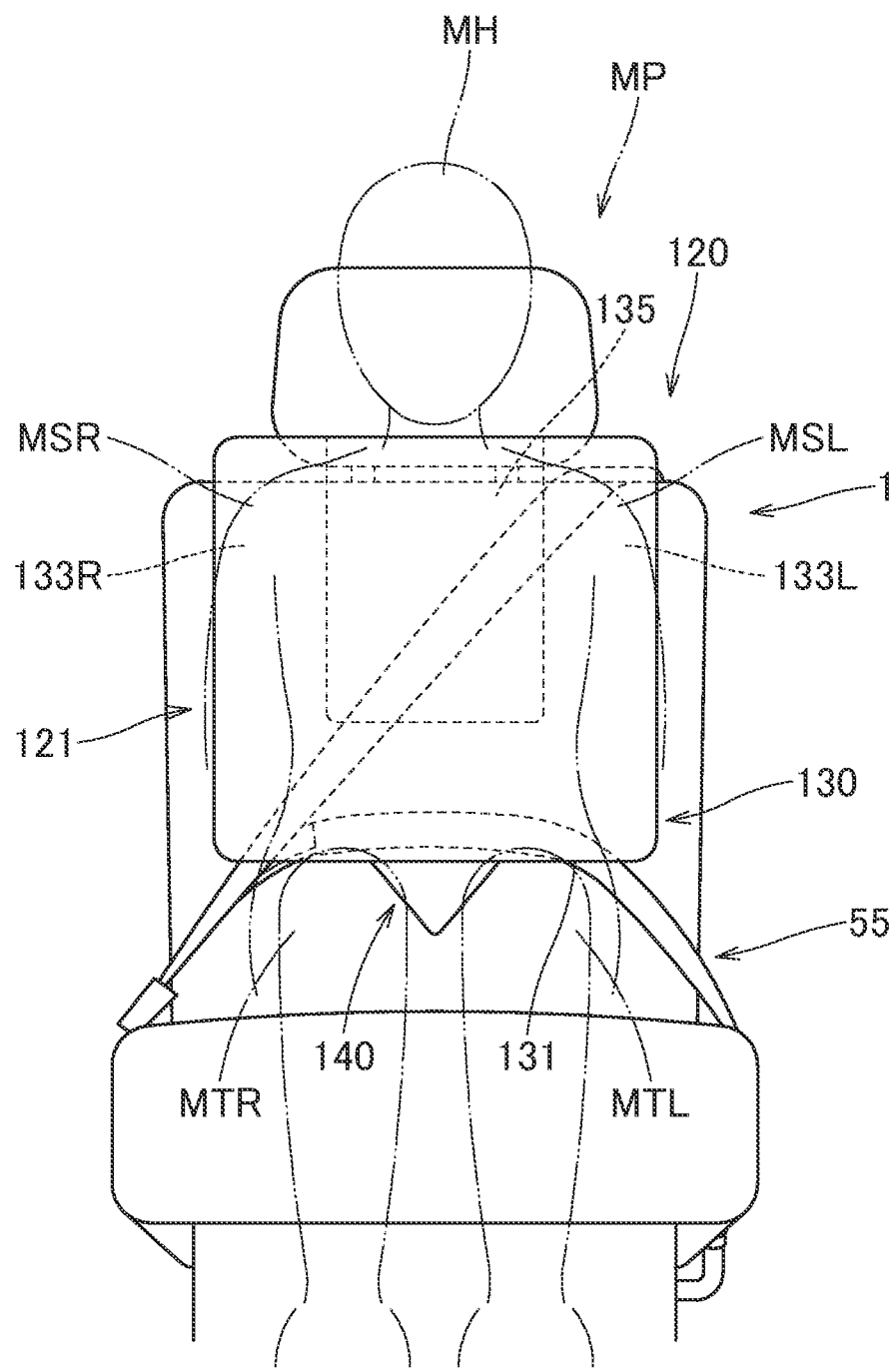
FIG. 33 is a front view of a seat at airbag deployment in an occupant protection device employing the airbag of FIG. 29.

The bag body 121 further includes, in the lower end 121b portion constituting the supporting inflatable portion 130, a protruding portion 140 that protrudes downward from the rear lower wall 124 (i.e. the supported surface 131). The protruding portion 140 is configured to be inflated and enter into a gap between the left and right thighs MTL, MTR of the occupant MP and adapted to be deployed in the gap between the left and right thighs MTL, MTR at airbag deployment, as can be seen in FIGS. 30 and 31. More specifically, the protruding portion 140 of this embodiment is designed to be inflated into a substantially triangular pyramid that protrudes downward from a central position in the left and right direction of the rear lower wall 124 and has a substantially V shaped sectional shape. The protruding portion 140 is formed to have a greatest protruding amount and a greatest width in the left and right direction at the front end 140a portion and become less protruding and narrower toward the rear end 140b, as can be seen in FIGS. 30 and 31. More specifically, the width in the up and down direction of the front end 140a portion of the protruding portion 140 is set so as to reach a vicinity of the center in the up and down direction of the thighs MTL, MTR, as can be seen in FIGS. 33 and 34. Further, in the front end 140a portion, the width in the left and right direction of a root portion (i.e. upper end portion) of the protruding portion 140 is slightly greater than the width in the up and down direction.

The bag body 121 as fully inflated has such widths in the up and down direction and in the left and right direction that the rear upper wall 123 covers a substantially entirety of the upper body MU of the occupant MP except the head MH, and that the upper end 121a is positioned farther upward than the shoulders MSL, MSR of the occupant MP, as can be seen in FIG. 34. Further, the bag body 121 as fully inflated has such a width in the front and rear direction that the rear lower wall 124 (i.e. the supported surface 131) widely covers the upper surfaces of the thighs MT of the occupant MP to a vicinity of knees, as can be seen in FIG. 34.

In the airbag 120 configured as described above, the supporting inflatable portion 130 and shoulder restraining portions 133L, 133R are each composed of a part of the bag body 121 which is formed into a substantially triangular prism elongated in the left and right direction. In other words, the supporting inflatable portion 130 and shoulder restraining portions 133L, 133R are continuously and integrally formed without any recessed regions there in between. With this configuration, the supporting inflatable portion 130 is able to support the shoulder restraining portions 133L, 133R further steadily as they arrest the shoulders MSL, MSR, so that the occupant MP is protected steadily. Moreover, the configuration that the recessed portion 135 is recessed forward between the shoulder restraining portions 133L, 133R prevents the thoracic region MB of the occupant MP from contacting the airbag 120 before restraint of the shoulders MSL, MSR.

Moreover, in the airbag 120 described above, the supporting inflatable portion 130 includes the protruding portion 140 that is configured to be inflated and protrude downward from the supported surface 131 and adapted to enter into a gap between the thighs MTL, MTR of the occupant MP at airbag deployment. Deployment of the protruding portion 140 between the thighs MTL, MTR helps align the center in the left and right direction of the airbag 120 with the center in the left and right direction of the occupant MP, thus deploy the airbag 120 in a positioned manner at airbag deployment. The protruding portion 140 may also be formed in the airbags 25, 80, 80A, 100, 100A of the foregoing embodiment.

Since the airbags 80, 80A, 100, 100A do not include an inflatable region which is configured to be inflated with an inflation gas in front of the thoracic region MB of the occupant MP, the airbags 80, 80A, 100, 100A will be prevented from contacting the thoracic region MB at airbag deployment adequately. Although the airbags 25, 120 are configured to contact the thoracic region MB by the thorax protecting region 42/a peripheral region of the recessed portion 135, they are configured to contact the thoracic region after restraining the shoulders MSL, MSR with the shoulder restraining portions 50L, 50R, 133L, 133R. Therefore, the airbags 25, 120 are able to restrain the upper body MU of the occupant MP including the thoracic region MB adequately without pressing the thoracic region MB excessively.

In the occupant protection device S in accordance with the foregoing exemplary embodiments, the seatbelt 7 and the inflator 17 are mounted on the seat 1. With this configuration, even if the seat 1 is moved largely with respect to the vehicle, like, by being slid forward or backward, or turned, the occupant protection device S will be able to protect the occupant MP sitting in the seat 1 adequately. The occupant protection device in accordance with the exemplary embodiments may also be mounted on a seat a retractor of the seatbelt of which is mounted on a vehicle body. The inflator may also be mounted on the vehicle body.

An occupant protection device in accordance with the exemplary embodiment includes: an inflator; a holding member that is adapted to be disposed in front of a pelvic region of an occupant as sitting in a seat; and an airbag that is formed of a sheet material having flexibility, the airbag being stored in and held by the holding member in a folded form, the airbag being configured to protrude from the holding member as disposed in front of the pelvic region of the occupant as sitting in the seat and adapted to cover a front surface of the occupant when fed with an inflation gas from the inflator. The airbag includes: a shoulder restraining portion that is configured to be deployed in front of shoulders of the occupant and adapted to restrain the shoulders at airbag deployment; and a supporting inflatable portion that is disposed in a lower end portion of the airbag as deployed, the supporting inflatable portion being configured to be deployed over thighs of the occupant and adapted to support the shoulder restraining portion, the supporting inflatable portion as deployed including, in an underside thereof, a supported surface that is adapted to be supported by the thighs of the occupant when the airbag arrests the occupant.

With the occupant protection device in accordance with the exemplary embodiment, when an occupant is going to move in such a manner that the upper body moves towards the lower body at airbag deployment, the shoulder restraining portion deployed in front of the left and right shoulders will restrain the shoulders and prevent the upper body from moving forward. That is, since the shoulder restraining portion arrests the left and right shoulders and absorb a kinetic energy of the upper body moving forward, the airbag is able to prevent the upper body of the occupant from tilting forward. Further, in the occupant protection device in accordance with the exemplary embodiment, the airbag as deployed includes, in the lower end portion, the supporting inflatable portion that is configured to be deployed over thighs of the occupant and support the shoulder restraining portion. This supporting inflatable portion as inflated is supported by the left and right thighs of the occupant by a wide area of the supported surface which is disposed in the underside of the supporting inflatable portion. With this configuration, even if the upper body of the occupant whose shoulders have been restrained by the shoulder restraining portion is going to move toward the lower body further, the supporting inflatable portion will support a lower portion of the shoulder restraining portion robustly so that the shoulder restraining portion is able to restrain the left and right shoulders steadily. Therefore, the airbag is able to restrain the upper body of the occupant softly and adequately.

Therefore, the occupant protection device in accordance with the exemplary embodiment is able to restrain the upper body of the occupant softly and adequately.

In various embodiments, the occupant protection device may be configured such that:

the supporting inflatable portion as inflated and deployed has a substantially board shape that extends substantially along a front and rear direction on the thighs of the occupant;

the airbag further includes a front inflatable portion that is configured to be inflated into a substantially board shape that extends rearwardly and upwardly from a front end portion of the supporting inflatable portion at airbag deployment; and the shoulder restraining portion is composed of a rear end portion of the front inflatable portion.

With this configuration, since the shoulder restraining portion composed of the rear end portion of the front inflatable portion is disposed substantially along the left and right direction in front of the left and right shoulders of the occupant sitting in the seat at airbag deployment, the shoulder restraining portion is able to restrain the shoulders steadily even if the airbag is deployed in a manner slightly displaced in the left and right direction with respect to the occupant at deployment.

In the above occupant protection device, the airbag may further include an opening-preventing means that prevents the rear end portion of the front inflatable portion from being separated from the supporting inflatable portion at airbag deployment. The opening-preventing means will steady the position of the front inflatable portion with respect to the supporting inflatable portion. In other words, the opening-preventing means will prevent the shoulder restraining portion from being displaced upward, and steady the position of the shoulder restraining portion with respect to the occupant.

In various embodiments, the occupant protection device may also be configured such that:

the supporting inflatable portion as inflated and deployed has a substantially board shape that extends substantially along a front and rear direction on the thighs of the occupant;

the shoulder restraining portion is formed to extend upward at a vicinity of a left end of and at a vicinity of a right end of the supporting inflatable portion at airbag deployment; and each of the shoulder restraining portions as inflated and deployed has a substantially board shape extending substantially along the front and rear direction, and is configured to restrain the shoulder of the occupant by a rear surface thereof.

With the occupant protection device configured as described above, the airbag will be able to protect occupants of various builds in a steady fashion, since the shoulder restraining portions are deployed substantially along the up and down direction in front of the occupant at airbag deployment, even if the positions in an up and down direction of the shoulders with respect to the seat vary from occupant to occupant.

In various embodiments, the airbag may further include a tether that connects the above-described shoulder restraining portions to one another in order to regulate a clearance between the shoulder restraining portions as deployed. The tether will prevent the shoulder restraining portions from being separated from one another when the shoulder restraining portions arrest the shoulders of the occupant, so that the shoulder restraining portions will restrain the shoulders of the occupant adequately.

Instead of the tether, the airbag may include a communicating inflatable portion that is configured to be inflated with the inflation gas, bring the shoulder restraining portions into communication with one another, and regulate a clearance between the shoulder restraining portions as deployed. Having a high rigidity when inflated, such a communicating inflatable portion will improve shape retention of the airbag as inflated, prevent the shoulder restraining portions from being deformed considerably (in other words, from being separated from one another or approximating to one another) at arresting the shoulders, so that the shoulder restraining portions will be able to restrain the shoulders of the occupant adequately.

In various embodiments, the occupant protection device may also be configured such that:

the airbag is configured to be inflated into a generally triangular prism shape whose axis extends generally in a left and right direction;

the supporting inflatable portion is composed of a lower end portion of the airbag as deployed;

the shoulder restraining portion is composed of a portion disposed in a vicinity of a left end of an upper end portion of the airbag as deployed and a portion disposed in a vicinity of a right end of the upper end portion of the airbag as deployed; and the airbag further includes, in a rear surface of a central portion in the left and right direction of the upper end portion of the airbag, a recessed portion that is recessed forward relative to the shoulder restraining portions between the shoulder restraining portions.

With this configuration, since the supporting inflatable portion and shoulder restraining portions are continuously and integrally formed without any recessed regions there in between, the supporting inflatable portion will be able to support the shoulder restraining portions further steadily as they arrest the shoulders, so that the occupant will be protected steadily. Moreover, the configuration that the recessed portion is recessed forward between the shoulder restraining portions will prevent the thoracic region of the occupant from contacting the airbag before restraint of the shoulders.

In various embodiments, the occupant protection device may be configured such that:

two shoulder restraining portions are provided to correspond to left and right shoulders of the occupant, respectively; and the airbag as deployed further includes:

a thorax arresting surface that extends substantially along an up and down direction above the supporting inflatable portion in a rear end portion of the airbag, the thorax arresting surface being continuous with a front portion of each of the shoulder restraining portions and adapted to arrest a thoracic region of the occupant as restrained by the shoulders by the shoulder restraining portion; and a head protecting portion that is disposed above the thorax arresting surface in an upper end portion of the airbag and adapted to protect a head of the occupant.

With this configuration, the head protecting portion will arrest the head of the occupant who has been restrained by the shoulders by the shoulder restraining portions, then the thorax arresting surface will arrest the thoracic region. That is, the airbag is able to arrest and protect not only shoulders but also head and thoracic region of the occupant.

In the occupant protection device described above, the airbag may internally include a regulating tether that is adapted to prevent the thorax arresting surface from protruding rearward at airbag deployment. At airbag deployment, the regulating tether will prevent the thorax arresting surface from protruding rearward excessively, in other words, help maintain a clearance in a front and rear direction between the thorax arresting surface and the rear end of the shoulder restraining portion which contacts with the shoulders of the occupant, so that the airbag will be able to protect the thoracic region of the occupant steadily and softly by the thorax arresting surface after restraining the shoulders with the shoulder restraining portion.

In various embodiments, the supporting inflatable portion may include a protruding portion that is configured to be inflated and protrude downward from the supported surface and adapted to enter into a gap between the thighs of the occupant at airbag deployment. Deployment of the protruding portion between the thighs will help align the center in the left and right direction of the airbag with the center in the left and right direction of the occupant, thus deploy the airbag in a positioned manner at airbag deployment.

In various embodiments, the holding member that holds the airbag may be composed of a lap belt, of the seatbelt, that is adapted to restrain the pelvic region when the occupant wears the seatbelt. This configuration will make it unnecessary to prepare a separate holding member for holding the airbag, and contribute to reduction of number of parts of the device.

What is claimed is:

1. An occupant protection device for protecting an occupant sitting in a seat of a vehicle, the occupant protection device comprising:

an inflator;

a holding member that is adapted so as to be disposed in front of a pelvic region of the occupant as sitting in the seat; and an airbag that is formed of a sheet material having flexibility, the airbag being stored in and held by the holding member in a folded form, the airbag being configured to protrude from the holding member and adapted so as to be disposed in front of the pelvic region of the occupant as sitting in the seat and adapted so as to cover a front surface of the occupant seated in the seat when fed with an inflation gas from the inflator, wherein the airbag includes:
a shoulder restraining portion that is configured and adapted so as to be deployed in front of shoulders of the occupant seated in the seat and adapted so as to restrain the shoulders at airbag deployment; and
a supporting inflatable portion that is disposed in a lower end portion of the airbag as deployed, the supporting inflatable portion being configured and adapted so as to be deployed over thighs of the occupant seated in the seat and adapted to support the shoulder restraining portion, the supporting inflatable portion as deployed including, in an underside thereof, a supported surface that is adapted so as to be supported by the thighs of the occupant seated in the seat when the airbag arrests the occupant.

2. The occupant protection device of claim 1, wherein:
the supporting inflatable portion as inflated and deployed has a substantially board shape adapted so as to extend substantially along a front and rear direction on the thighs of the occupant seated in the seat;
the airbag further includes a front inflatable portion that is configured to be inflated into a substantially board shape that extends rearwardly and upwardly from a front end portion of the supporting inflatable portion at airbag deployment; and
the shoulder restraining portion is composed of a rear end portion of the front inflatable portion.

3. The occupant protection device of claim 2, wherein the airbag further includes an opening-preventing means that prevents the rear end portion of the front inflatable portion from being separated from the supporting inflatable portion at airbag deployment.

4. The occupant protection device of claim 3, wherein the opening-preventing means is composed of a pair of tethers that connect the supporting inflatable portion and the front inflatable portion at a vicinity of a left edge of and at a vicinity of a right edge of the airbag, respectively.

5. The occupant protection device of claim 3, wherein:
the airbag as deployed includes a thick-inflated portion that is disposed at a front end portion of the front inflatable portion where the front inflatable portion and the supporting inflatable portion are connected to one another; and
the opening-preventing means is composed of the thick-inflated portion.

6. The occupant protection device of claim 1, wherein:
the supporting inflatable portion as inflated and deployed has a substantially board shape adapted so as to extend substantially along a front and rear direction on the thighs of the occupant;
the shoulder restraining portion is formed to extend upward at a vicinity of a left end of and at a vicinity of a right end of the supporting inflatable portion at airbag deployment; and
each of the shoulder restraining portions as inflated and deployed has a substantially board shape extending substantially along the front and rear direction, and is configured and adapted so as to restrain the shoulder of the occupant seated in the seat by a rear surface thereof.

7. The occupant protection device of claim 6, wherein the airbag further includes a tether that connects the shoulder restraining portions to one another in order to regulate a clearance between the shoulder restraining portions as deployed.

8. The occupant protection device of claim 6, wherein the airbag further includes a communicating inflatable portion that is configured to be inflated with the inflation gas, bring the shoulder restraining portions into communication with one another, and regulate a clearance between the shoulder restraining portions as deployed.

9. The occupant protection device of claim 1, wherein:
the airbag is configured to be inflated into a generally triangular prism shape whose axis extends generally in a left and right direction;
the supporting inflatable portion is composed of a lower end portion of the airbag as deployed;
the shoulder restraining portion is composed of a portion disposed in a vicinity of a left end of an upper end portion of the airbag as deployed and a portion disposed in a vicinity of a right end of the upper end portion of the airbag as deployed; and
the airbag further includes, in a rear surface of a central portion in the left and right direction of the upper end portion of the airbag, a recessed portion that is recessed forward relative to the shoulder restraining portions between the shoulder restraining portions.

10. The occupant protection device of claim 1,
wherein two shoulder restraining portions are provided and adapted so as to be disposed to correspond to left and right shoulders of the occupant seated in the seat, respectively; and
wherein the airbag as deployed further includes:
a thorax arresting surface that extends substantially along an up and down direction above the supporting inflatable portion in a rear end portion of the airbag, the thorax arresting surface being continuous with a front portion of each of the shoulder restraining portions and adapted so as to arrest a thoracic region of the occupant which is seated in the seat and as restrained by the shoulders by the shoulder restraining portion; and
a head protecting portion that is disposed above the thorax arresting surface in an upper end portion of the airbag and adapted so as to protect a head of the occupant seated in the seat.

11. The occupant protection device of claim 10, wherein:
the airbag further includes a main inflatable portion that is configured to be inflated into a generally triangular prism shape whose axis extends generally in a left and right direction;
each of the shoulder restraining portions is configured to protrude farther rearward than the main inflatable portion in a vicinity of a left edge of and in a vicinity of a right edge of an upper end portion of the main inflatable portion as deployed;
the supporting inflatable portion is composed of a lower end portion of the main inflatable portion as deployed;
the head protecting portion is composed of the upper end portion of the main inflatable portion; and
the thorax arresting surface is composed of a rear surface of an area of the main inflatable portion between the supporting inflatable portion and the head inflatable portion.

12. The occupant protection device of claim 10, wherein the airbag further internally includes a tether that is adapted to prevent the thorax arresting surface from protruding rearward at airbag deployment.

13. The occupant protection device of claim 1, wherein the supporting inflatable portion includes a protruding portion that is configured to be inflated and protrude downward from the supported surface and adapted so as to enter into a gap between the thighs of the occupant seated in the seat at airbag deployment.

14. The occupant protection device of claim 1, wherein the holding member is composed of a lap belt of a seatbelt that is adapted so as to restrain the pelvic region of the occupant as sitting in the seat and wearing the seatbelt.

15. The occupant protection device of claim 14, wherein the seatbelt and the inflator are mounted on the seat.

\* \* \* \* \*